United States Patent
Kaun

(10) Patent No.: US 8,263,248 B2
(45) Date of Patent: *Sep. 11, 2012

(54) CELL STRUCTURE FOR ELECTROCHEMICAL DEVICES AND METHOD OF MAKING SAME

(75) Inventor: Thomas D. Kaun, New Lenox, IL (US)

(73) Assignee: Inventek Corporation, New Lenox, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/236,405

(22) Filed: Sep. 19, 2011

(65) Prior Publication Data

US 2012/0034500 A1   Feb. 9, 2012

Related U.S. Application Data

(60) Division of application No. 11/714,485, filed on Mar. 6, 2007, now Pat. No. 8,021,775, which is a continuation-in-part of application No. 10/192,818, filed on Jul. 10, 2002, now Pat. No. 7,195,840.

(60) Provisional application No. 60/305,339, filed on Jul. 13, 2001.

(51) Int. Cl.
   *H01M 2/18* (2006.01)
(52) U.S. Cl. .................... 429/94; 429/130
(58) Field of Classification Search .......... 429/53, 429/94, 130, 142, 174, 246
   See application file for complete search history.

(56) References Cited

U.S. PATENT DOCUMENTS

| | | | |
|---|---|---|---|
| 4,048,397 A | 9/1977 | Rothbauer | |
| 4,322,484 A | 3/1982 | Sugalski | |
| 4,713,597 A | 12/1987 | Altmejd | |
| 5,219,673 A | 6/1993 | Kaun | |
| 5,567,544 A | 10/1996 | Lyman | |
| 5,593,462 A | 1/1997 | Gueguen et al. | |
| 5,757,090 A | 5/1998 | Kirjavainen | |
| 6,017,410 A | 1/2000 | Baccini | |
| 6,087,035 A | 7/2000 | Rogers et al. | |
| 6,730,438 B2 | 5/2004 | Nakanishi et al. | |
| 7,195,840 B2 * | 3/2007 | Kaun | 429/94 |

FOREIGN PATENT DOCUMENTS

| | | |
|---|---|---|
| EP | 0 771 040 A2 | 2/1997 |
| JP | 05325943 A | 12/1993 |
| JP | 10-308206 A | 11/1998 |
| JP | 20000090965 A | 3/2000 |

OTHER PUBLICATIONS

Thomas D. Kaun, et al., "Disc-Shaped, Li-ion Cells for High-Rate Applications," Proc. of the 40th Power Sources Symposium, p. 387 (2002).

* cited by examiner

*Primary Examiner* — Gregg Cantelmo
(74) *Attorney, Agent, or Firm* — Cherskov Flaynik & Gurda, LLC

(57) ABSTRACT

An electrochemical device comprising alternating layers of positive and negative electrodes separated from each other by separator layers. The electrode layers extend beyond the periphery of the separator layers providing superior contact between the electrodes and battery terminals, eliminating the need for welding the electrode to the terminal. Electrical resistance within the battery is decreased and thermal conductivity of the cell is increased allowing for superior heat removal from the battery and increased efficiency. Increased internal pressure within the battery can be alleviated without damaging or removing the battery from service while keeping the contents of the battery sealed off from the atmosphere by a pressure release system. Nonoperative cells within a battery assembly can also be removed from service by shorting the nonoperative cell thus decreasing battery life.

4 Claims, 12 Drawing Sheets

FIG. 9
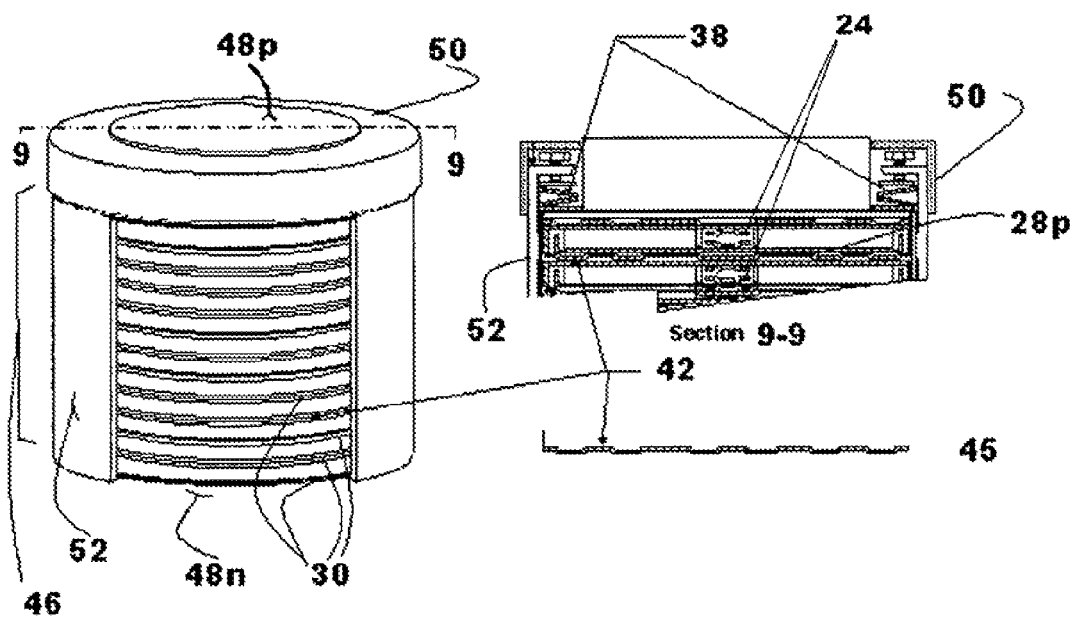
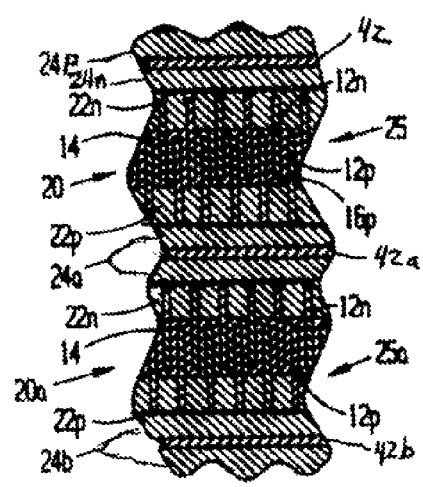

Fig. 15 Current(A), Voltage(V) vs. Test_Time(s)

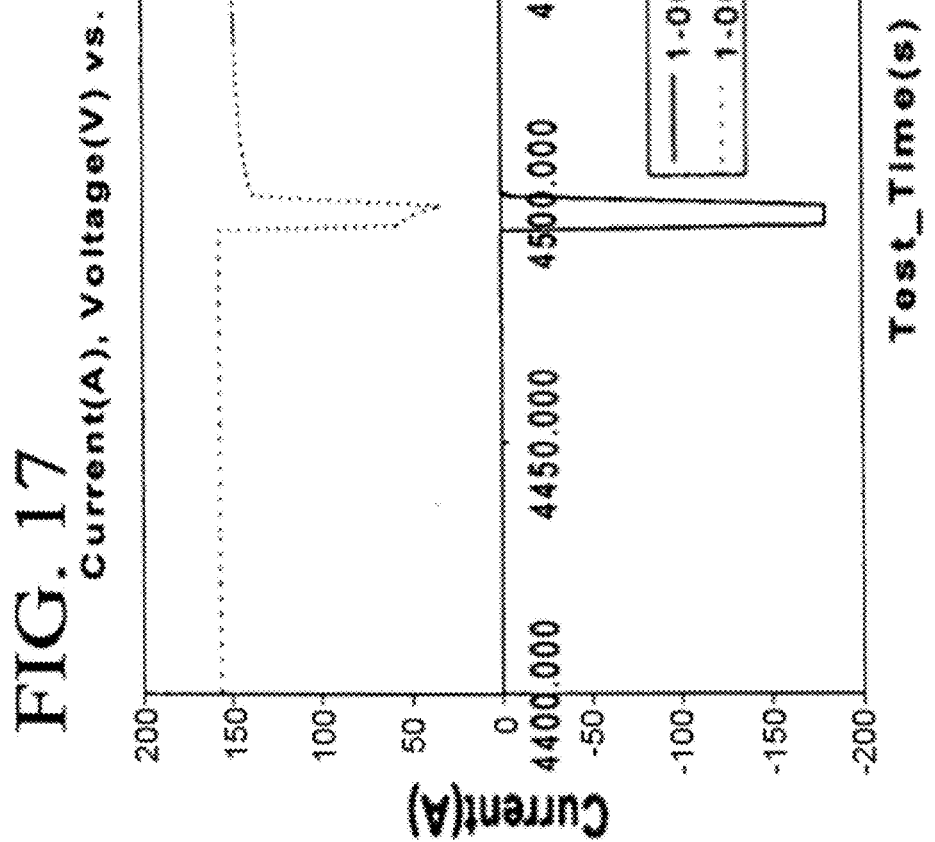

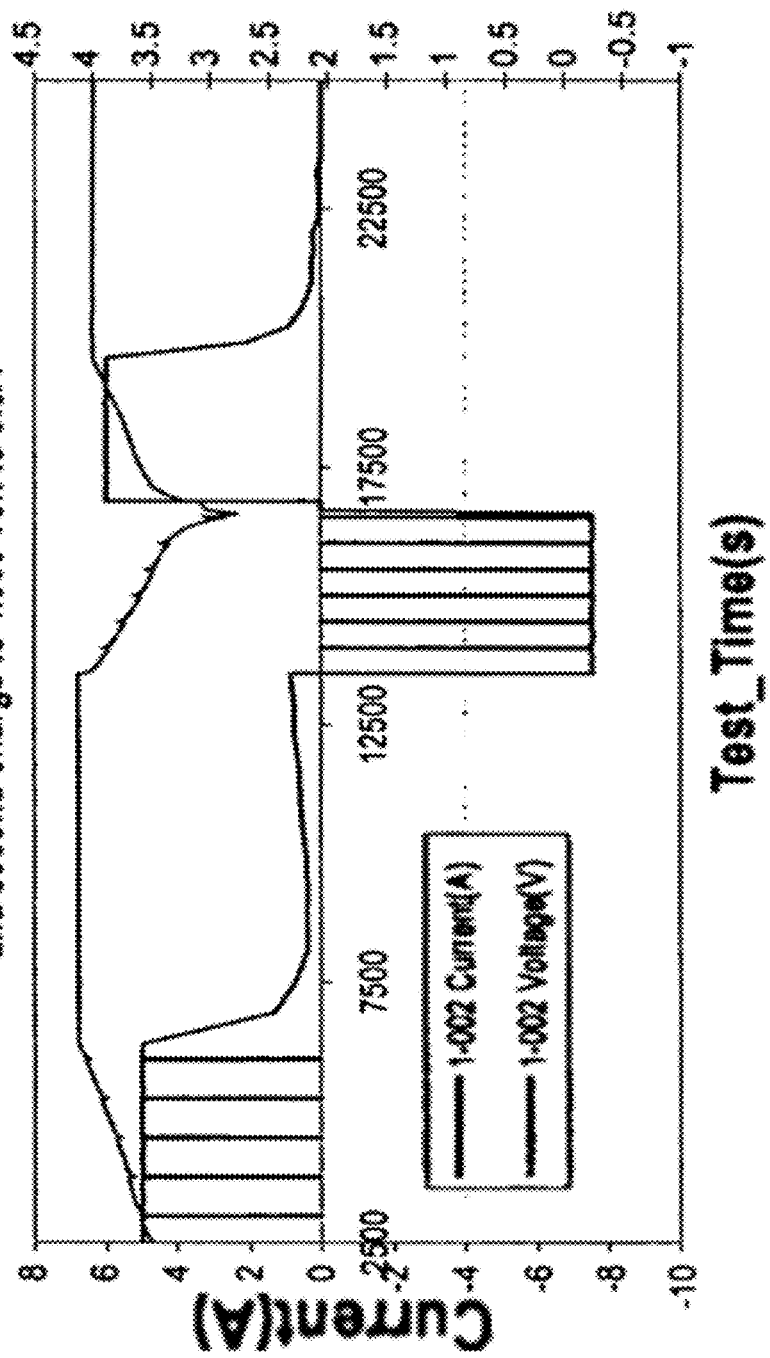

CELL STRUCTURE FOR ELECTROCHEMICAL DEVICES AND METHOD OF MAKING SAME

This application is a Divisional Application to U.S. application Ser. No. 11/714,485, filed on Mar. 6, 2007 and subsequently issued as U.S. Pat. No. 8,021,775 B2 on Sep. 20, 2011, which claimed priority to U.S. Provisional Patent Application No. 60/305,339, filed Jul. 13, 2001 and a continuation-in-part of U.S. application Ser. No. 10/192,818, filed Jul. 10, 2002, and subsequently issued as U.S. Pat. No. 7,195,840 on Mar. 27, 2007, the entire contents of which are hereby incorporated by reference.

FIELD OF THE INVENTION

The present invention relates to improved electrochemical devices, such as batteries, capacitors, fuel cells, sensors or the like. More specifically this invention relates to more user-friendly electrochemical devices that provide high specific power and energy outputs per weight and volume of the device, and to the methods of making these improved electrochemical devices.

BACKGROUND OF THE INVENTION

With the increasing pace of advances in electronics there has been a corresponding increase in the need for electrochemical devices that provide the energy density, efficiency and safety to power advanced electronic devices, especially portable electronic devices, while still being economically viable. Older battery configurations are often unsuitable to meet these increased demands. Out of environmental and efficiency concerns, the reach of electricity providing devices has been expanded to new areas including hybrid electric vehicles. Ideally, an electrochemical device will provide high current density, decrease the internal resistance of the battery and effectively manage the thermal output of the electrochemical device to increase the longevity of the device.

These features can be achieved by providing massive and/or large surface-area connections between electrodes and cell current collectors, and specifically between cells in a battery. Generally to preserve high specific energy and power, W/kg, Watt-hours per kilogram (Wh/kg) and, Watts per kilogram (W/kg), present technologies and devices fall far short of these goals. A second critical feature of the high power device is internal heat removal. High power to external circuitry generally generates a like amount of energy as heat in short time duration internal to the cell. Excessive temperature rise will destroy (e.g. melt the microporous polymer separator or autoignite the flammable organic electrolyte) or significantly shorten the useful life of the Li-ion cell.

An electrochemical device comprised of cathode and anode electrodes physically exposed to an electrolyte can generically be used to convert between chemical and electrical energies. A housing can enclose these electrode and electrolyte components, and can even seal them from the atmosphere. Batteries, fuel cells and capacitors are but a few such specific electrochemical devices to which this invention relates.

As the electrical power in terms of voltage and/or amperage of each pair of cathode and anode electrodes (or cell) is generally small, many separate pairs of cathode and anode electrodes or cells can be used in a single housing. Current collectors are generally used to electrically interconnect the cells, in parallel and/or in series, to provide usable voltage and amperage outputs at exposed terminals on the electrochemical device.

The electrochemical device performs usable work when ions pass between the electrodes of each cell via the electrolyte, and when electrons concurrently pass through each cell via the electrodes. The generated voltage per cell is predetermined by the electrochemical reaction of the component materials used, and the generated amperage and/or power available is dependent on the configurations and masses of these active components.

The specific output energy of the device can be provided in terms of watts-hours per device weight, and the specific output power of the device can be provided in terms of watts per device weight. Output values of existing electrochemical devices are typically small fractions of theoretically possible output values, because of internal resistances and other inefficiencies (hardware mass and volume).

The resistance to ion conduction between the electrode elements is one major source for internal power loss. Such resistance, R, can be theoretically determined with the expression $$R = \rho l/A.$$

where:
"$\rho$" (rho) is the impedance value of the electrolyte;
"$l$" is the thickness of the electrolyte; and
"A" is the interfacial contact area between the electrode elements and electrolyte.

The ionic-impedance value, $\rho$, is not easily subject to modification and is not effective as a design parameter. Designers of electrochemical devices thus strive to reduce the electrolyte thickness "$l$", and to increase the interfacial contact area "A" between the electrode elements and the electrolyte.

Different configurations of the cathode and anode electrodes, electrolyte separation, and the current collection have been proposed. For example, a cathode electrode band can be zig-zagged to define separate compartments for holding electrolyte, and inserted with elongated rod-like anode electrodes into the electrolyte spaced from the cathode electrode. The interfacial contact area "A" effectively is less than the overall surface area of the anode rods, as some rods oppose one another rather than the cathode.

Also, a zig-zagged, folded separator band can define opposing compartments for holding and isolating plate-like cathode and anode electrodes, with electrolyte engulfing all of these components. In an alternative design, each cell can be formed with C-shaped electrodes and a Z-shaped separator sandwiched therebetween. Alternatively, a separator band having electrically conductive surfaces can be folded and sandwiched separate sets of respective plate-like cathode and anode electrodes between the separate oppositely facing folds. A "jellyroll" cell can be formed by coiling a preformed assembly of cathode and anode electrodes and a separator on itself, to yield a cylindrically shaped electrochemical device, with the face-to-face electrodes and sandwiched electrolyte and separator structures, increasing the interfacial contact area "A" between the electrodes.

However, the very breadth of the facing electrodes and sandwiched electrolyte and separator raise another cause of concern, namely the structural sufficiency during assembly and during operation to maintain and support the electrode elements physically separated. This includes withstanding thermal expansion and contraction forces of the cell components during operational temperature changes, such as packing the cell into a box-like housing. Increasing the thickness of the sandwiched electrolyte and separator to provide needed strength and/or durability also increases the ion-conducting electrolyte thickness "l", offsetting benefits obtained by increased interfacial contact area "A".

Current collectors used in these cell arrangements add significant weight, and thus reduced specific cell energy and power outputs. For example, isolated conductors are generally connected to the electrodes and routed along extended paths independently of the electrodes to the external terminals. These conductors must carry the full cell current, and thus must be of sufficient mass and cross-section to keep internal resistance manageably low. For a typical battery design of connected terminals, electrode tab/current collector/cell terminal resistance/battery terminal resistance can account for a 50% reduction in battery power output from theoretical capability. Generally, massive connectors are used to avoid power loss for high powered batteries.

Also, these cell arrangements provide electrodes of limited size and/or thickness, limiting the quantities of usable electrode materials and thus limiting maximum cell storage energy and/or operating cycle-life, particularly for rechargeable cells.

The dilemma of these designs is that power gains obtained by increasing the interfacial electrode area "A" across the electrolyte generally are typically offset by increased electrolyte thickness "l", and the weight and volume of the current collectors reduce specific energy and power outputs. Power can be increased, but only at the expense of reduced energy storage capacity per weight and volume and at increased costs due to needed additional hardware. High interfacial area "A" of the spirally wound "jellyroll" configuration merely trades off usable power against the energy density; but minimum separator thickness is needed for cell durability and cycle-life. Existing bipolar cell arrangements do not escape this power and energy trade off dilemma; nor do fuel cell electrochemical devices.

The rolled-ribbon cell technology disclosed in U.S. Pat. No. 5,219,673 has made great strides achieving enhanced power density for electrochemical devices. Specifically applied to Li/organic-based electrolyte chemistries, improved batteries are formed using the stackable disk-shaped cells to realize near optimum power capability from these cells. Further objectives of batteries for high-pulse power requirement, such as hybrid electric vehicles and power tools, is to continue to reduce battery cost and increase durability. These Li/organic-based electrolyte battery chemistries, although exhibiting quite high voltage (3-5 volts), have relatively low current density capabilities. One limiting factor is the attempted use of relatively-thin components, i.e. the electrode and separator layers. A practical device requires a lot of active area. For example, with peak current density of 10 mA/cm$^2$, it can require 1000 cm$^2$ active area to achieve 10 A. For hybrid electric vehicles, the required current is on the order of 100 A at 200-400 volts (equivalent to 20-40 kW).

A further dilemma is the large number of small cells required to form such batteries. A major power loss (internal heat generation) is the consequence of batteries with large numbers of small cells (e.g. 1 Ampere-hour (Ah) capacity as in the 18650 cell). More recently larger cells (10 Ah) have used a prismatic configuration. These cells have broad electrodes with multiple tabs connected to a traditional terminal connection. These prismatic cells are hard-wired together (terminal-to-terminal) in a rectangular box. Nonetheless, this arrangement of substantially larger cells can still sacrifice 50% of the theoretical power of the cell chemistry.

However, previous button type cells, typically having very small capacity of 5-50 milli-Ah, lacked ease or consistency of battery assembly and/or distribution of high currents through the cell to the exterior terminals possibly due to the limited conductor paths of hardware components. A hybrid vehicle battery would require hundreds of thousands of these cells.

Thus there is continuing and persistent need for electrochemical devices which have high energy density, provide high power output and approach the theoretical limit for electrical power output.

A Li/organic-based electrolyte battery for high power applications, such as hybrid electric vehicle, must also incorporate features to enhance safety and battery longevity. As there are battery operation and degradation conditions that generate internal gas pressure, there needs to be non-catastrophic, cost effective means to relieve the gas pressure. The typical means is to include a rupture disc on the housing of the Li-ion cell. Rupture of a disc housing causes irreversible failure of that battery, and if a disc ruptures electrolyte may escape to further degrade the battery.

Thermal management is critical to long life of Li-ion batteries in retaining battery capacity particularly due to electrolyte degradation. Batteries capable of generating tens of kW must deal with a like amount of heat generation. Under high pulse power, heat is generated at the electrode/separator interface due to limited ionic conduction. For the conventional jelly-rolled cell, the most direct path for heat loss is across the layers of heat sensitive microporous polymer. Excessive temperature within the cell will locally shutdown the microporous polymer and higher temperatures result with further abuse. Excessive abuse can lead to auto-ignition of organic electrolyte.

SUMMARY OF THE INVENTION

The present invention relates to electrochemical devices. In one embodiment, the electrochemical device comprises an electrode assembly. The electrode assembly includes a plurality of elongated positive electrodes, a plurality of elongated negative electrodes, and a plurality of separation layers engagable with each other to form a continuous separation barrier between each of the plurality of positive electrodes and the plurality of negative electrodes. The plurality of layers positioned such that the positive electrodes, separation layers, and negative electrodes wound around a central axis thereby forming a coil of alternating electrode and separation layers such that the separation layer prevents direct contact between successive electrode layers, a first longitudinal edge of the positive electrode layer extends beyond a first longitudinal edge of the separation layer, and a first longitudinal edge of the negative electrode extends beyond a second longitudinal edge of the separation layer. The separator tensioned across the electrode assembly and defines a cell width, the width of the electrodes extending beyond the width of the separator. The electrochemical device further comprises a housing having a positive plate electrically coupled to the first longitudinal edge of the positive electrode and a negative plate electrically coupled to the first longitudinal edge of the negative electrode, wherein the electrode assembly is enclosed by the housing.

In another embodiment, the electrochemical device comprises an electrode assembly. The electrode assembly includes an elongated positive electrode with a first longitudinal edge, an elongated negative electrode with a first longitudinal edge, and a separation layer having a first longitudinal edge and a second longitudinal edge. The positive electrode, the separation layer, and the negative electrode are wound around a central axis thereby forming a coil of alternating electrode and separation layers such that the separation layer prevents direct contact between successive electrode layers, the first longitudinal edge of the separation layer extends beyond the first longitudinal edge of the separation layer, and the first longitudinal edge of the negative electrode extends beyond the second longitudinal edge of the separation layer. The device further comprising a housing having a positive plate electrically coupled to the first longitudinal edge of the positive electrode and a negative plate electrically coupled to the first longitudinal edge of the negative electrode, wherein the electrode assembly is enclosed by the housing. The electrode assembly being slightly wider than the plates of the housing.

The above described embodiments are set forth in more detail in the following description and illustrated in the drawings described hereinbelow.

BRIEF DESCRIPTION OF THE DRAWINGS

The preferred exemplary embodiment of the invention will hereinafter be described in conjunction with the appended drawings, wherein like numerals denote like elements and:

FIG. 9 shows a high voltage battery made up by stacking disc-shaped electrochemical cells of the present invention, along with a cross-sectional view and a detailed cross-sectional view of the high voltage battery, taken along line 9-9.

FIG. 17 depicts a current vs. time profile for a cell pulsed at 180 A (35C rate) to provide in excess of 500 W for 2.4 kW/kg peak specific power for these cells.

FIG. 18, depicts the reversible shorting of a Li-ion cell having initial excess positive (Li metal oxide) capacity that is dependent on charge voltage control. The "bypass" current at 4.125V can be used to equalize the capacity of these cells in a battery

DETAILED DESCRIPTION OF THE INVENTION

Figure 1:
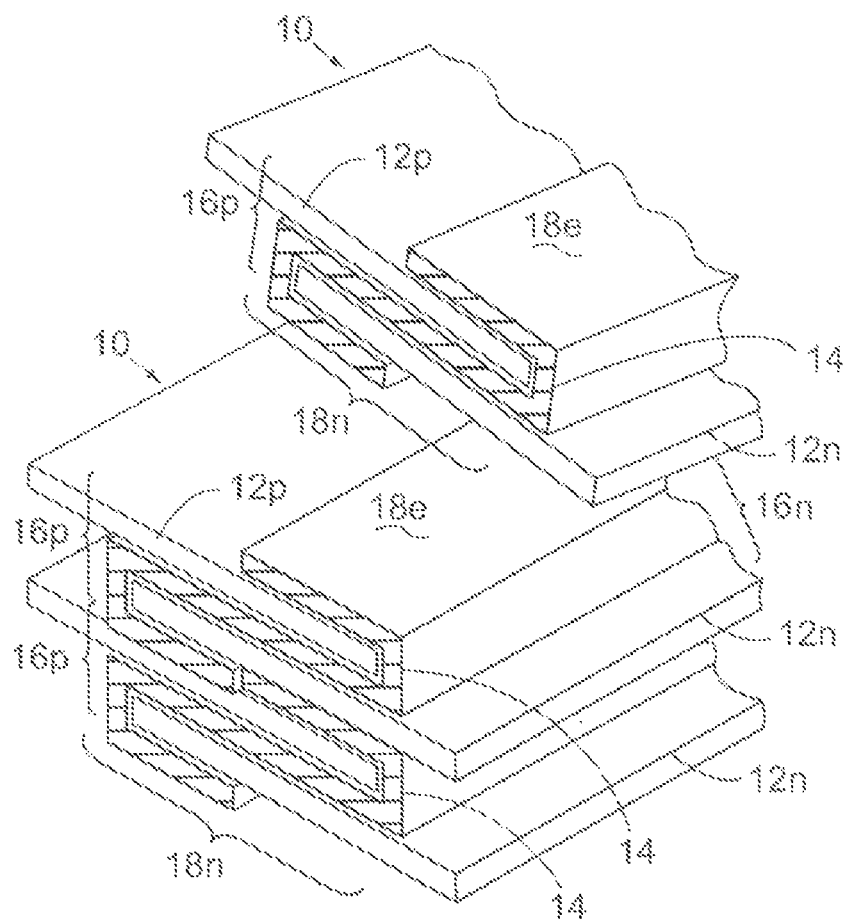
FIG. 1 is a cut-away perspective view of the electrode/separation layer configuration in the electrode assembly of the present invention.

The present invention provides an improved cell arrangement involving the orientation of positive and negative electrodes, interpositioned separator and/or electrolyte, and current collectors used in making up the electrochemical device. The improved cell uses an electrode assembly with laminated electrode/foils comprised of alternatively arranged, generally parallel, positive and negative electrodes, and a separator layer and/or electrolyte formed of a very thin ionic-conductive ribbon-like layer configured in a tight serpentine manner and physically interposed between the electrodes. This basic laminate cell preassembly is layered on itself, such as by winding or coiling it as a spiral to form an electrode assembly, in the general shape of a flat disc (wherein the diameter is preferably greater than twice the thickness of the disk) and the cell membrane is sandwiched between plate-like current collectors with the electrode interfaces primarily perpendicular to the current collectors, to make up an electrochemical cell.

In one embodiment, the present invention provides an electrochemical device made up of an electrode assembly which includes: (i) an elongated positive electrode with a first longitudinal edge; (ii) an elongated negative electrode with a first longitudinal edge; and (iii) a separation layer having a first longitudinal edge and a second longitudinal edge. In the electrochemical device the positive electrode, the separation layer, and the negative electrode are wound around a central axis thereby forming a coil of alternating electrode and separation layers such that the separation layer prevents direct contact between successive electrode layers. Additionally, the first longitudinal edge of the separation layer extends beyond the first longitudinal edge of the separation layer, and the first longitudinal edge of the negative electrode extends beyond the second longitudinal edge of the separation layer. More effective use of expensive electrode coating provides several advantages, i.e. greater power output per weight of electrode. Cell power is increased by approximately twenty times relative to cell capacity. Cell hardware for the rolled-ribbon is a lesser portion of cell weight compared to the prismatic cell having terminal posts. Large intercell connection (discs stacked face to face) effectively transmits power to the battery terminals.

The electrochemical device can also include a housing having a positive terminal electrically coupled to the first longitudinal edge of the positive electrode and a negative terminal electrically coupled to the first longitudinal edge of the negative electrode, wherein the electrode assembly is enclosed by the housing, and an electrolyte adjacent to the electrode assembly and enclosed within the housing.

The housing typically includes a first cup including the positive terminal and a second cup including the negative terminal. In this manner the first cup and the second cup are joined together to form the housing such that the first and second cups are electrically isolated from one another and further wherein the positive terminal and negative terminal are generally planar.

In another embodiment the housing seals the contents of the cell from the ambient atmosphere so that a pressure release component or feature can relieve the pressure build-up within the housing when the pressure within the housing reaches a predetermined limit, while leaving the cell operable after the pressure build-up within the housing is released.

One or more of these electrochemical devices can be coupled together electronically in parallel or in series. When coupled, one of the electrode assemblies can provide a component for shorting the electrode assembly when the electrode assembly becomes nonoperative.

In yet another embodiment housing of the device, which due to the electrode's perpendicular orientation exhibits excellent heat rejection, includes channels which allow for a medium to circulate within, through or around the housing which further provides for cooling of the device. In the rolled-ribbon cell, the electrode foils act as cooling fins at the electrode/separator interface to draw heat out to the cell housing. The most direct path for heat loss is not across the layers of heat sensitive separation layer, but to the cell housing, which can be in contact with the cooling fluid.

Still another embodiment of the device, the positive electrode is not physically attached, such as metallurgically welded together, to the positive terminal and negative electrode is not metallurgically attached to the negative terminal.

Another embodiment of the electrochemical device of the present invention combines an electrode assembly including: (i) an elongated positive electrode; (ii) an elongated negative electrode; and (iii) a separation layer, with a component coupled to the electrode assembly for shorting the electrode assembly when the electrode assembly becomes nonoperative. In this embodiment, the positive electrode, separation layer and the negative electrode are wound around a central axis forming a coil of alternating electrode and separation layers such that the separation layer prevents direct contact between successive electrode layers. This embodiment can also include a housing made up of a positive terminal electrically coupled to a first longitudinal edge of the positive electrode and a negative terminal electrically coupled to a first longitudinal edge of the negative electrode, wherein the electrode assembly is enclosed by the housing. The housing also encloses an electrolyte. This embodiment can further include a pressure release component which relieves pressure build-up within the housing when the pressure within the housing reaches a predetermined limit, wherein the electrochemical device is still operable after the pressure build-up within the housing is released.

In still another embodiment an electrochemical device comprising an electrode assembly in contact with an electrolyte, coupled to and enclosed by a housing which possesses the functionality of a pressure release component. The electrode assembly is made up of at least an elongated positive electrode, an elongated negative electrode and a separation layer wherein the positive electrode, the separation layer, and the negative electrode are wound around a central axis thereby forming a coil of alternating electrode and separation layers such that the separation layer prevents direct contact between successive electrode layers. The electrode assembly is coupled to the housing, which has a positive terminal electrically coupled to a first longitudinal edge of the positive electrode and a negative terminal electrically coupled to a first longitudinal edge of the negative electrode. The pressure release component relieves pressure build-up within the housing when the pressure within the housing reaches a predetermined limit, wherein the electrochemical device is still operable after the pressure build-up within the housing is released and the seal reseals itself. Internal gas pressure control is a safety feature that is achieved without jeopardizing the life expectancy of the battery. It is usually accomplished with rupture discs, which would cause the cell to be lost if ruptured. In the present invention, pressure release is accomplished with spring loading a stack of peripherally sealed cells. Because the cells, in essence, can burp to relieve gas pressure, they will reseal themselves. The seal configuration has enhanced exclusion of moisture infiltration/diffusivity with use of both polyethylene gasket and silicone fluid coolant. Because there is no added component to the cell, this design for internal pressure control is cost effective.

In still another embodiment, an electrochemical device comprising an electrode assembly in contact with an electrolyte, coupled to and enclosed by a housing. The electrode assembly is slightly wider than the parallel plates of the housing. The two telescoping halves of the cell housing are pressed together with the Rolled-Ribbon electrode element inside. A prescribed compressive load is used for the start up and operation of the cell and continues for the cell as part of the stacked cell battery.

In yet still another embodiment, an electrochemical device comprising an electrode assembly in contact with a electrolyte-filled separator, coupled to and enclosed by a housing. A Z-folded separator is tensioned across cell element thickness. The folded separator defines cell width and extension of electrode ribbon beyond separator. This procedure can enable a rather minimal 0.1-0.2 mm extension beyond the separator. Indexing of Z can distribute overlap across cell width. Rather than half an overlap of separator across the "first" third of the cell width, we can move it to the middle third, then to the last third, then back to the first and repeat. Especially for larger cells having 100 s of windings, the distributed separator overlap improves the integrity of the cell element.

Further, the separator is tensioned to control tightness of wind cell to form a stiff disc.

Use of double layer separator, and/or with a separator coating can be used to increase cell element integrity. In embodiments of the invention, the separation layer comprises two layers.

In a continued embodiment related to the separator, an outer plastic band (to finish the cell wind) is heat welded in place and retains winding tension. Further when the electrode material layer swells during initial cell charge, the outer plastic band offers hoop stress to confine the Rolled-Ribbon element. The separator layer is in compression for the fully-charged (formed) cell.

In still another embodiment, an electrochemical device comprising an electrode assembly in contact with an electrolyte, coupled to and enclosed by a housing that is easily disassembled for recycling and/or regeneration of cell materials. The housing that has a pressure seal can be made to be fully opened when unrestrained. In one method, the cell is submitted to vacuum and the cell pops apart. Remove the outer retaining band and the cell can be unwound into three individual rolls of anode, separator, and cathode.

The individual rolls can aid in process and cost of recycling of materials. The further improves the economics of lifecycle, and/or to enable cell rejuvenation processing, where electrode ribbons can be processed and the cell can be rebuilt with fresh separator.

In yet still another embodiment, the two telescoping halves of the cell housing are pressed together with the Rolled-Ribbon electrode element inside separated by a relatively large peripheral seal of polyethylene plastic (a relatively low-temperature melting polymer material) can be used to benignly short the cell under a destructive situation. It is undesirable for a cell that is undergoing destructive conditions, (eg. thrown into a fire, nail penetration, crushing, etc.) to form a high resistance short to cause localized heating and high temperature. A more benign failure (avoid explosion) results from a well-distributed short.

In still another embodiment, an electrochemical device comprising an electrode assembly having a Li-ion electrochemistry having an excess positive electrode capacity can form a reversible short. That is, the negative electrode is supplied with Li beyond the typical range. For the C/LiNiCoO2 chemistry, the excessive negative capacity ratio is 1.4 or greater. Other chemistries may require different ratios to exhibit the reversible short phenomenon. This phenomenon appears to have occurred due to the unique compactness of the cell. In so doing, the cell is safeguarded from destructive overcharging. This reversible cell shorting mechanism can also be used to equalize the battery (make all the cells have the same state of charge) without electronic means to maximize overall cell performance.

Because of the expense of lithium ion batteries, which also provide the greatest electrochemical potential and largest energy content, the rolled-ribbon cell configuration of the present invention has particular utility for cells employing lithium/organic electrolyte cell chemistry, although the present invention is also well suited to other cell chemistries, including, but not limited to, nickel/metal hydride and alkaline electrolyte systems. Of a particular interest, the technology provides high pulse power devices, at reduced costs and with excellent thermal management producing kW levels of power.

The improved cell arrangement of the present invention uses a ribbon-like cell assembly, with coated foil electrode strips extending beyond the edge of the folded separator when viewed in cross section. The extended electrode areas can have lesser or no active electrode material and the electrode ribbons are preferably cored with metal foils or other electron conducting material e.g. carbon paper and/or electrically conductive polymer. For a 5 inch diameter cell, 100 to 250 ft of electrode edge contact with a cell housing is typically achieved.

The invention provides for adding electrode material or cell capacity by way of extending the electrode strips beyond the separation layer. Rather than having electrode discs applied to the major faces of the rolled-ribbon cell or cell separator membrane as in earlier button type electrochemical cells, the electrode extensions define reservoirs of electrode material. These extensions are subsequently compacted into a disc as the cell is assembled into the disc enclosure hardware.

The invention also provides for a separator ribbon configuration in which the folds of the separation layer are oriented up and down at each edge. In cross-section, the separator is a "Z" configuration with a defined distance between the folds. This arrangement serves to align the electrode ribbons with respect to the separator and helps to ensure the positioning of the electrodes and separator during the cell winding operation. This alignment aids in forming a flat disc cell.

The invention can provide an electronic component, which can serve to electrically remove a shorted or defective cell. Preferably the electronic component is embedded within the cell and preferably resides within at the center hub of the cell for ease of manufacture, for example by initiating the cell winding. In a preferred embodiment a diode is utilized for removing (or short-circuiting) the nonoperative cell. Similarly, the component can act to bypass current at overcharge or excessive voltage conditions.

The invention also provides a button-type cell enclosure. Consisting of two opposing shallow cups, which are electrically isolated from each other with a polymeric "U" shaped gasket at the outer edge. The gasket further forms a gas-tight seal for the interior contents of the cell. These cups members interface with the perpendicular electrode member of another electrochemical cell to serve as both a current collector and a cell terminal. The positive electrode substrate is essentially of the same material as the positive terminal surface and the negative electrode substrate is essentially of the same material as the negative terminal surface. The positive is generally aluminum and the negative is generally copper. The Rolled-Ribbon cell assembly is a disc that is slightly wider that the distance between the parallel surfaces of the assembled current-collector cups to assure contact with the electrode foil substrates.

The invention also provides a high voltage and high capacity battery assembled by stacking a plurality of button-type cells together. The cells are typically connected in series. Control of internal gas pressure and maintenance of contact pressure between the button cell in the stack can be accomplished with active pressure, such as a Belleville spring washer. The specified limit for internal pressure is handled by release via a peripheral seal 32, which can reseal after an event.

The invention also provides for an augmentation of passive thermal management of the high power battery by manifolding cooling fluid about the battery stack and between the disc-shaped cells. A thermostated control pumps the fluid to external cooling such as radiator or small refrigeration unit. The cell hardware pans of the button-type battery enclosures conduct heat from the electrode/separator interface. Further, via flow passages between the faces of the button cells, a more direct removal of heat is achieved.

The invention also provides a method of making the improved cell construction and its electrochemical devices.

A rolled-ribbon cell configuration according to the present invention can release close to 100% of theoretical power of the Li/organic electrolyte cell chemistry in substantially larger cells of 5-10 Ah capacity with pulse currents of 100-200 A from a single cell. Further these stackable cells, preferably having 125 cm diameter, intercell contact can deliver the power at the battery level from the battery terminals. Moreover, effective use of a given amount of costly lithiated Ni/Co oxide electrode/electrolyte materials can produce a significant cost advantage, and advantages in thermal management. The rolled-ribbon cell used inside a stackable disk cell housing will promote longevity of these costly battery materials. Unlike the prismatic, jelly-rolled cells, internally generated heat from the rolled-ribbon cell can be drawn out from the cell via short conduction paths without crossing the heat sensitive microporous polyethylene/polypropylene separator. Accordingly, the present cells can be operated without the need for active thermal management.

The enlarged cut-away perspective view of FIG. 1 illustrates a cell preassembly 10 suited for forming an electrochemical device such as a battery, fuel cell, sensor or capacitor. The cell preassembly 10 specifically includes alternatively arranged generally parallel positive electrode 12p and negative electrode 12n, and a separator or electrolyte layer 14 interposed therebetween somewhat in the form of a laminate structure. In this disclosure, the terms anode and cathode will also be used for the electrodes, somewhat interchangeably, as well as the terms separator and/or electrolyte. In the illustrated electrochemical battery device, the separator/electrolyte 14 is of an ionic conductive material; the positive and negative electrodes 12p and 12n are of both ionic and electronic conductive materials; and the terminals of the cell are of electronic-conductive material. The actual materials of these components can depend on the type of electrochemical battery. The electrodes are generally metal foils coated with particles of the active electrode material. Examples of suitable electrodes include without limitation, 10 micron Al or Cu and can facilitate low cell-resistance and heat removal. Due to the configuration of the present cells, i.e. their short path length, other materials can be utilized, such as carbon fiber mat which generally has lower conductivity than metal foil. Preferred materials for the cathode are lithiated metal oxides while preferred materials for the anode are carbon and/or graphite.

Both electrodes can consist of high surface area powders that are held in a 8 percent by weight (wt %) PVDF (polyvinylidene fluoride, e.g. Kynar 720 from Elf Atochem, USA) binder matrix. The positive electrode also contains 8 wt % carbon black (e.g. mesocarbon microbeads (MCMB) or C-Black) for electrical conductivity. Both electrodes are applied as a slurry to the metal foils (typically 10 micron thick copper foil for the negative electrode and 25 micron thick aluminum foil for the positive electrode) which after drying adheres as porous layers (50 micron thick each side) held together by PVDF binder and is later infiltrated with the electrolyte. For the Li-ion cell chemistry, there are two major types of cathode material: Lithium Nickel-Cobalt Doped Oxide and Lithium Manganese Oxide Spinel. Both compositions are available from FMC Corp. Lithium Div. Gastonia, N.C. 28054 as Lectro Plus 600 and Lectro Plus 300, respectively. The preferred composition is $Li Ni_xCO_yM_zO_2$ is where Ni x is $0.6<x<0.8$, Co y is $0.1<y<0.3$, and Mz (e.g. Al) $0.05<z<0.1$. The composition $LiMn_2O_4$ is where 2 Li:Mn ratio is 1.02-1.06:1.

The separator 14 is typically a microporous polymer film that is required to maintain physical integrity after undergoing the mechanical manipulations to form the cell preassembly 10. Preferably, separator 14 is a polyethylene/polypropylene film known as CELGARD® 2300 and CELGARD® 2400 (Celgard LLC, Charlotte, N.C.), polymeric film known as NAFION® (Dow Chemical Company, St. Louis, Mo.), or polyethylene oxide with lithium bis-trifluoromethanesulfate amide (Sigma-Aldrich, Milwaukee, Wis.). As can be seen in FIG. 1, the positive and negative electrodes 12p and 12n extend beyond the edge of the separator layer 14. Preferably, the electrodes extend beyond the edge of the separator layer 0.1 to 1.0 mm, such as 0.5 mm, or more. One skilled in the art will readily be able to determine the preferred length which the electrodes should extend beyond the separator layer based on a number of factors including electrode thickness, separator thickness and the physical requirement of the cell.

A cross-section of the cell preassembly 10 shows that the cell preassembly has opposing sides 16p and 16n, and opposing sides 18e and 18n. The negative electrode 12n extends to and along the sides 16n and 18n, the positive electrode 12p extends to and along pan of the side 16p, and the separator or electrolyte 14 defines the entire side 18e and completes the remainder of the sides 16n, 18n and 16p. The cell preassembly 10, with this cross-section, can be elongated indefinitely.

The cell preassembly and/or cell membrane can be formed by adapting otherwise conventional techniques. The materials for the electrodes or separator/electrolyte can be available in a flexible or pliable form, to extrude and wind as thin ribbons. The component material of the electrodes can also be available as a liquid, or as a powder to be mixed and fluidized with a binder/solvent system, which can be extruded or selectively tape cast or painted by stencil where needed. Powders can be very fine (1-10 micron size) and when mixed can make up 60-90% by weight of the mixture, the binder/solvent making up the balance (preferably about 20%). Binders can be selected from a group including polyvinyl alcohol, PVDF (polyvinylidine fluoride polymer), or thermal setting resin, e.g. polyisobutylene that can decompose by depolymerization. A plasticizer, such as butyl benzol thalate, can also be added to allow the material to be mechanically worked (rolled, corrugated, extruded) at low temperatures.

Figure 2:
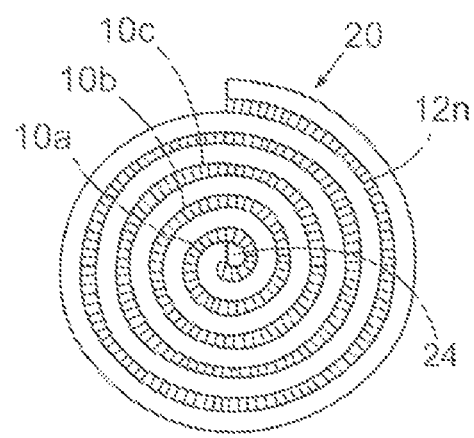
FIG. 2 is a right side facial view showing the electrode assembly coiled on itself to define a rolled-ribbon cell (laminate cell membrane) of the type suited for forming an electrochemical device according to this invention.

A cell preassembly 10 can be coiled upon itself about a center core 24 to produce successive layers 10a, 10b, and 10c of a rolled-ribbon cell. FIG. 2 is a right side facial view showing the electrode assembly 22 coiled on itself to define a rolled-ribbon cell (laminate cell membrane) of the type suited for forming an electrochemical device according to this invention.

Figure 3:
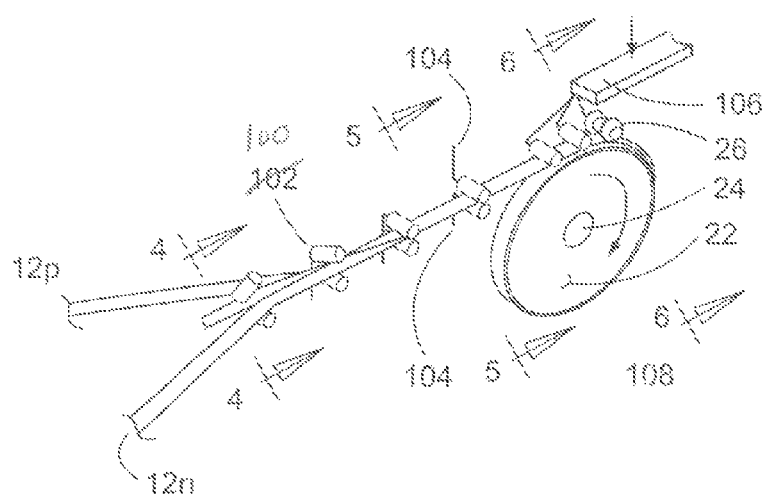
FIG. 3 depicts the process for making the electrode/separator assembly of the present invention.

For example, the electrode ribbons in FIG. 3 are usually metal foil ribbons that have been coated with a thin uniform layer (25 to 100 micron thick) of active electrode particulate (~400 U.S. mesh). The electrode particulates are held in a matrix of PVDF. The electrode is prepared as a paint-like mixture having about 8 wt % PVDF dissolved in NMP (1-methyl-2-pyrrolidinone). The electrode mix is typically applied by doctor-blade. Controlled drying removes the NMP, leaving behind the electrode particles attached to the foil by the PVDF binder. The completed electrode ribbons are handled in a dry room atmosphere through cell winding and assembly into the button-like, peripherally sealed (airtight) enclosures for each cell.

Forming of the cell preassembly 10 of the present invention can be performed as depicted in FIG. 3 by folding a strip of separator 14 into the shape of a Z, and sliding the electrodes 12p and 12n into opposite folds of the separator 14, typically performed with a merging block. In FIG. 3, a single cell preassembly is illustrated as being wound by a mandrel (not shown) on center core 24, to form a single spiral cell membrane. A cell fabrication apparatus, that is typically located within a dryroom, contains three reels of ribbon material to supply the positive electrode, negative electrode and separator to the winder.

The method of forming the cell as in FIG. 3 can be reversed to permit the electrode and separator materials to be separated for the purposes of cell material recycle and/or rejuvenation. The recycle materials recovery may proceed by first popping open the cell housing as in FIG. 7. A expedient method to pop apart the cell is to put the cell unrestrained in vacuum. The internal gasses expand to push apart the telescoped cell cup halves. Then, the ribbons of electrode and separator can be separated wound to accommodate further recovery processing.

Figure 4:
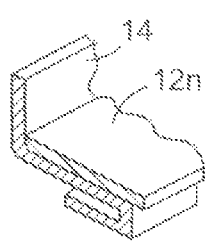
FIG. 4 is a cross-sectional view of the cell preassembly taken along line 4-4 of the process of FIG. 3.
Figure 5:
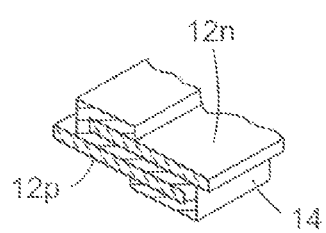
FIG. 5 is a cross-sectional view of the cell preassembly taken along line 5-5 of the process of FIG. 3.

As can be seen from FIGS. 4 and 5, the electrodes 12p and 12n are folded into the separator 14 in successive steps 100, 102, 104 and 106. Preferably, the electrodes 12p and 12n extend about 0.5 mm beyond the edge of the separator layer. After the cell preassembly 10 is formed, then the preassembly 10 is wound into a disc shape in step 108 on underlying layers of itself, FIG. 6. A liquid dispenser (and/or stylus) or an adhesive tape (not shown, but positioned between FIGS. 5 and 6) can glue (e.g. using an organic solution of polyvinylidene fluoride, e.g. KYNAR® 720) the edge 20 of the separator/electrolyte 14 to the edge 20 of the next successive separator layer to seal the separator/electrolyte elements of adjacent layers together to define a coiled cell membrane. Appropriate binders/sealant can likewise be applied to this layer interface by other means (not shown). The separator/electrolyte 14 seals with the underlying adjacent separator/electrolyte layer 14, and effectively closes the ends of the positive electrodes 12p, to have them open only to one side; whereas the negative electrodes 12n open only to the opposing side.

In forming the electrode assembly 22 in the disclosed manner, the ribbon-like electrode elements and the separator/electrolyte element are pliant, generally composed of the specific active material of the electrodes or separator/electrolyte embedded in a polymer matrix. The coiled cell membrane of FIG. 2 can further be compressed slightly radially and axially, between rollers or the like (not shown), to establish and/or assure firm contact between the components of the cell preassembly and winding layers of adjacent cell preassemblies.

Preferably, the cell windings are tensioned during the fabrication process to maintain electrode/electrolyte(separator) interface for optimal performance. This configuration increases the acceptable choices for separator material and thickness. The separator can, for example, be painted on. The wound disc is generally physically confined at completion by a non-conductive outer ring, or bonding of the final wrap of the disc-shaped cell.

The core 24 can contain, or be substantially composed of, an electrical component for battery control. This electrical component removes the cell from operation when the cell becomes nonoperative, preferably by shorting the cell. A diode can effectively remove a failed cell from the operation of a battery stack or prevent overcharge from excessive charge voltage. A preferred diode is a Schottky, reverse-blocking, 0.8 V switching diode which serve as a low "dropout" for an integrated circuit bq24007 for battery charge control, offered by Texas Instruments USA. This diode integrates a 1.2 A-MOSFET and also provides charge-voltage limitations, e.g. 4.2 volts for eliminating over-charge damage. Embedding the diode within the cell makes control of the cell more direct. Alternatively, the center core 24 can be made of electrode material 12p or 12n or separator 14.

Figure 6:
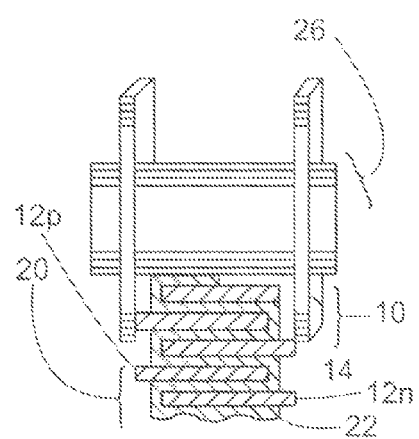
FIG. 6 is a cross-sectional view of the cell preassembly taken along line 6-6 of the process of FIG. 3.

According to FIGS. 3 and 6, a guide 26 is used to align the protruding electrode edges to form a flat disc. The guide can also serve to debur the electrode foil edge and can also be used to remove electrode coating from the very edge portion of the foil. This feature aids in minimizing the subsequent contact resistance between electrode and current collector. For designs with significant electrode protrusion (reserve capacity), the guide serves to bend/compact the electrode edges as the disc-shaped cell is wound. Preferably, the protruding electrodes are bent in the same direction to provide a common orientation. Although the preferred configuration of the separator 14 is Z-shaped, the separator 14 can encompass other embodiments envisioned by those in the art as long as the separator adequately isolates the successive electrode from one another in the completed device. For example, separator 14 can be configured in a U-shape wherein the electrodes 12p and 12n are placed within the fold of the U. Additionally, although the cell preassembly 10 shown in FIG. 1 has two electrodes 12p and 12n separated by one Z-shaped separator 14, the cell preassembly 10 is not limited to this configuration as will be readily understood by one skilled in the art. For example, the cell preassembly can have in excess of two electrodes 12p and 12n separated by the separator layer 14 by providing a wider separator layer 14 and providing more folds therein for receiving the electrodes 12p and 12n.

As the preferred embodiments of the inventive electrochemical devices are related to the "jellyroll" configuration. The cell preassembly 10 can be layered or coiled on itself, such as into a spiral shown for example in FIG. 2, with the negative electrode side 18n of one turn being snugged against the separator or electrolyte side 18e of the adjacent turn to have the electrolyte side 18e facing out. The separator edges can form a butt-joint to separate the successive electrode layers. Preferably, the separator edges can overlap, be joined together with glue that is applied during the rolling operation or both to ensure complete separation of the successive electrode layers. The legs of the "Z" can be manipulated, such that the overlap of separator material can be positioned incrementally across the cell thickness. The sides 16p and 16n can be generally aligned, so that the coiled adjacent cell preassembly layers 10a, 10b, 10c, etc. in effect can form a laminate electrode assembly 22 extended in the direction generally transverse or even perpendicular to the elongated directions of the electrodes 12p and 12n. Although electrode assembly 22 as a disc is preferably made up of one long cell preassembly 10 coiled on itself, a plurality of cell preassemblies, for example, 2, 3, 4, 5 or more, can be coiled around a common central axis to form electrode assembly 22. Inner center core 24 of insulating material, separator or electrolyte material can be used to start the coil so that the cell membrane can have no intermediate voids or gaps. As will be readily apparent to those skilled in the art, the electrode assembly 22 can have any desired thickness or diameter. Finally, a plastic ring or wrap of plastic 40 (shown in FIG. 8) is used to keep the coil under rolled compression and from unwinding.

Figure 7:
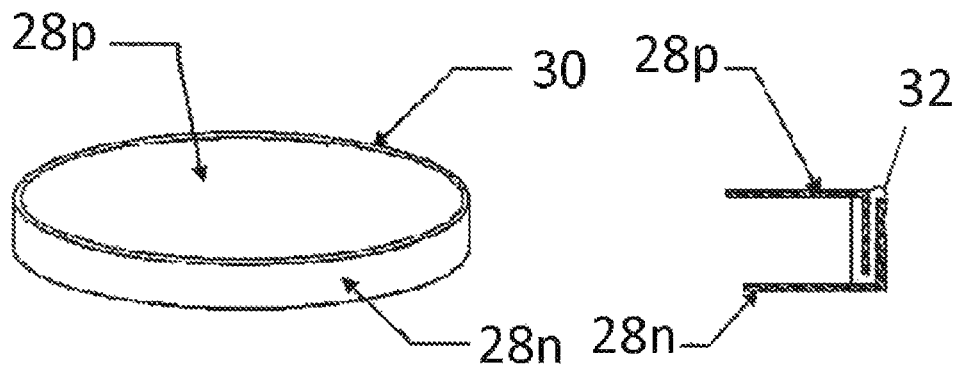
FIG. 7 depicts the housing for the electrochemical device of the present invention.

A suitable containment housing 28, such as that shown in FIG. 7, is disposed around the electrode assembly 22, to isolate the positive and negative electrodes 12p and 12n electrically from each other thereby forming a cell 30. The housing 28 also serves to contain the electrode assembly 22 and seal the contents of the cell from the atmosphere. The housing 28 preferably contains an electrolyte which surrounds and contacts the electrode assembly 22. A preferred electrolyte is a Lithium salt, $LiPF_6$, dissolved in organic carbonates (e.g. EC:DEC 1:1, where EC:DEC is ethylene carbonate:diethyl carbonate) from Ferro Corporation. Preferably, the electrolyte infiltration into the wound cell disc is performed in an inert atmosphere (e.g. a dryroom) and includes the use of vacuum to infiltrate the fine pore structures of the electrodes and separator with electrolyte. The preferred configuration of the housing 28 is depicted in FIG. 7. As can be seen in FIG. 7, the housing consists of two cups 28p and 28n joined together, and electrically isolated from each other with a seal 32 located around the periphery of the cups 28p and 28n. Preferably the "U" shaped seal 32 is made of polyethylene. At least a portion of the outward face of cups 28p and 28n is a terminal electrically coupled to only one of the electrodes of the electrode assembly 22. Preferably the entire cup 28p and 28n is a suitable material to serve as a terminal to increase electric conduction. The composition of the cups 28p and 28n can be any suitable material, but preferably the cups are made of a material that is compatible with the electrode materials 12p and 12n, and in particular the passive portion of the electrode. More preferably, the electrode foil substrate materials 12p and 12n are substantially the same composition as the cup materials 12p and 12n in order to minimize contact resistance between the electrodes 12p and 12n and the cups 28p and 28n, respectively. A preferred material for the cup 28p, which contacts the positive electrode 12p, is aluminum and a preferred material for the cup 28n, which contacts the negative electrode, is copper plated stainless steel when the cell employs lithium ion cell chemistry. This material selection is appropriate for Li/polymer chemistry as well. For a Ni/metal hydride battery, cups of Ni and stainless steel for corrosion stability may be selected. Metallized conductive polymer cups can be substituted for the metal parts to permit weight reduction for any of the cell chemistries. In other embodiments, the electrical conductivity of the disc-shaped cell enclosure could be made from conductive plastic because electrons need only pass through its thickness and it has a large area of contact, such as to the next cell in the stack.

Figure 8:
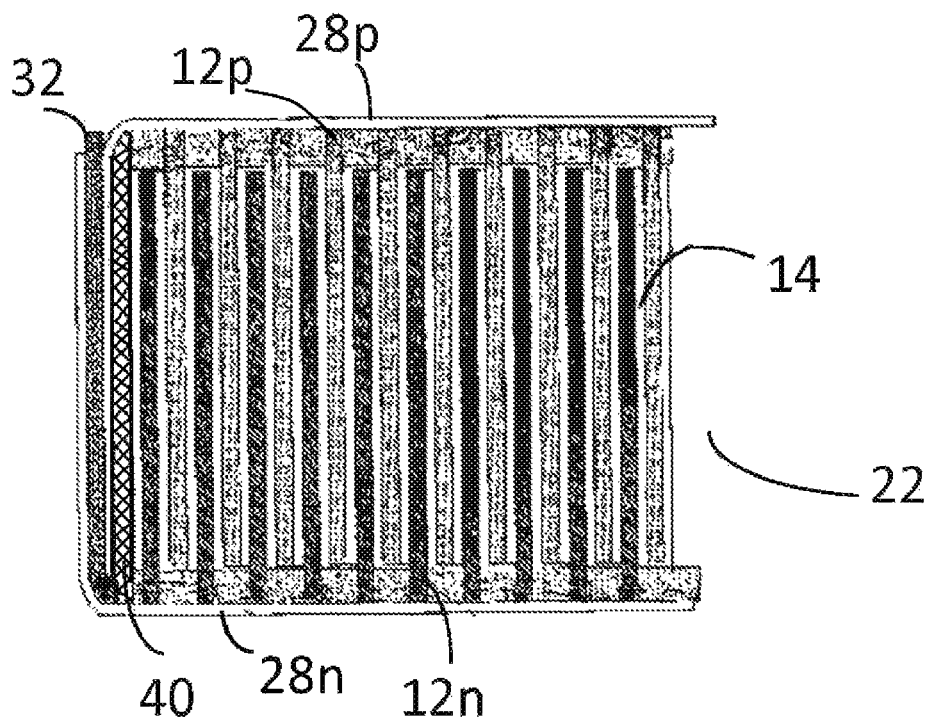
FIG. 8 is a radial edge section of a bipolar electrochemical device incorporating the electrode assembly of the present invention.

FIG. 8 illustrates positive and negative electrodes 12p and 12n that have surface configurations generally opposed to one another and extended in axial directions primarily transverse to the paired current collectors, and the separator/electrolyte 14 follows a collapsed "Z" configuration having portions generally elongated in the axial direction transverse to the paired current collectors. The electrodes thus overlap primarily along regions that are generally thin and ribbon-like, flattened and extended in the axial direction generally normal to the sides 16p and 16 of the preassembly, or to the electrode assembly 22. The positive and negative electrodes 12p and 12n are alternately arranged across the cell membrane, and respectively are electrically common with only one of the terminals of the paired cups 28p and 28n.

This cell configuration, FIG. 8, offers interfacial area (similar to that identified as "A" in the above algorithm) between the adjacent positive and negative electrodes that is comprised of: (1) the transverse regions between the closed end of each electrode and the opposite polarity electrode material layer; and (2) the overlapping axial regions between the opposed electrodes of each cell preassembly and adjacent cell preassembly. The total interfacial area contributed by the transverse regions (1) of the electrodes will be the overall transverse planar area of the cell or approximate facial area of a cell terminal, a fixed amount, reduced by the approximate total area of either the positive or negative electrodes. On the other hand, the total interfacial area contributed by the axial regions (2) can be a significantly higher multiple, depending only on the electrode proportions. In a typical preferred preassembly 10, the opposing sides 16p and 16, can be spaced apart by a width less than 9 mm and the opposing sides 18e and 18n can be spaced apart by a height between 0.1-1.0 mm. As the preassembly height is comprised of the thickness of both electrodes and twice the thickness of the separator/electrolyte, the individual thickness of these components can be less than 0.1 mm. The preferred width-to-height ratio of a cell preassembly more specifically will be between being approximately square and being very flattened (at ratios such as between 1-to-1 and 50-to-1)

The total interfacial area contributed by the axially overlapped electrode regions can thus be made one hundred times the total interfacial area contributed by 5 transverse regions, and accordingly, this cell configuration can provide one hundred times more electrode interface area than the simple area of adjacent planar current collector. When in a preferred cell, the approximate thickness of a electrode assembly 22 can be very small, such 9 mm or less, while the thickness of the separator/electrolyte interposed between the electrodes is likewise very small, such as less than 0.1 mm.

In some embodiments the cell's disc shape is important to achieve high power and excellent internal heat rejection. This is especially as disc can be stacked together to form a battery. The relative disc dimensions are cell radius to cell thickness ratio of 10:1, cell size ranges of 21 mm thick by 220 mm radius to 2 mm thick by 15 mm radius are preferred. A typical cell can be 6.5 mm thick by 65 mm radius.

Figure 12:
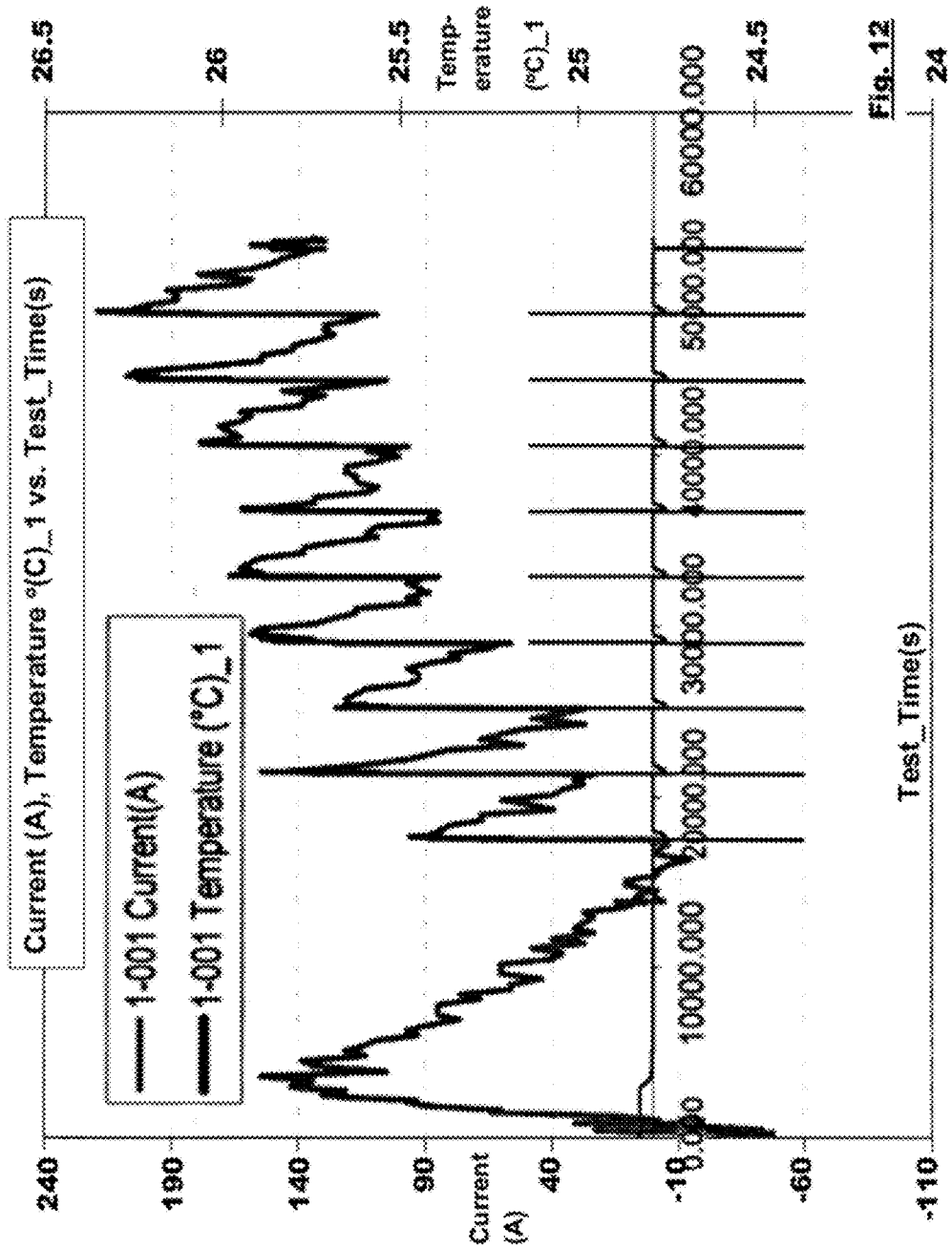
FIG. 12, depicts the skin temperature monitoring of rolled-ribbon cell during HPPC Tests (60 A discharge pulse)
Figure 14:
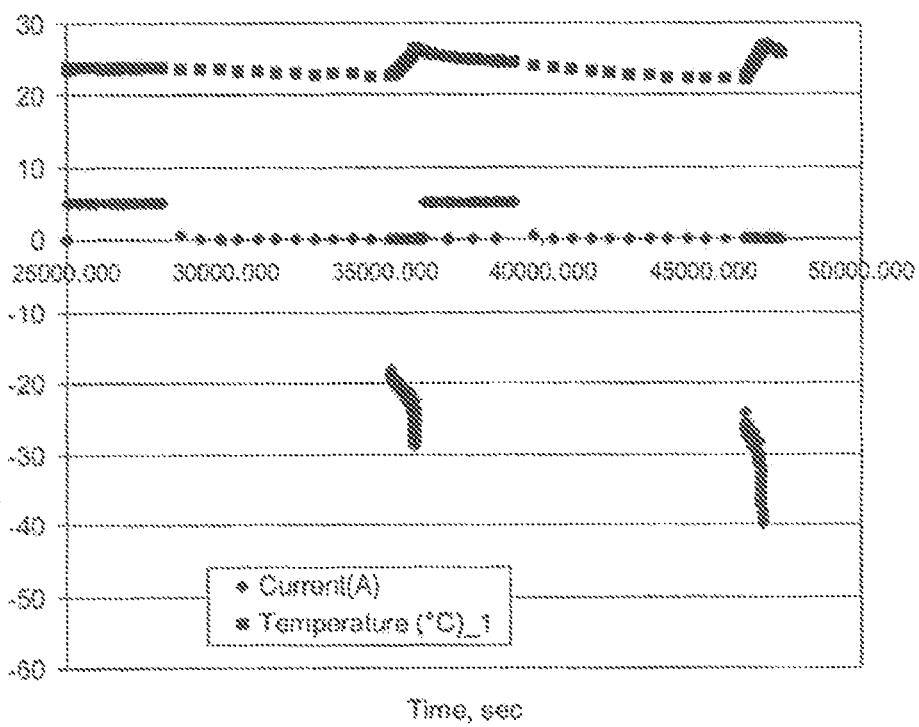
FIG. 14 depicts a Ragone plot, comparing the specific energy of the rolled ribbon cell with a spiral wound Li-ion cell at high power Output (25° C.)

As in FIG. 9, cells 30 which include the housing 28 are preferably stacked together with intervening coolant channels 42 and are contained within a larger housing 52 having spring compression from an end plate 50. The disc-shape is also important to the passive thermal management to the cell, which provides an inherent safety feature. The cell housing can act as a heat sink for internally generated heat. In sustained high power discharge (500 W/kg), there is less than a 10° C. rise in cell temperature, and under the most severe high pulse power demand within the cell there is less than a 2° C. temperature rise. (FIGS. 12 and 14). This degree of cell temperature control indicates passive thermal management and inherent safety for high power applications. Notably, cooling fluid is not a requirement for operation of the present cells, either when used singly or plurally under normal, pulsed or high power discharge conditions, although in some designs it may be desirable to provide active cooling as is found in other devices. The thermal management of the stacked cell battery relies on the capability of the single cell to reject heat in the stacked cell arrangement.

As in FIG. 8, each cell 30, etc. is substantially sealed, by the electrically conductive cup-like forms 28p and 28n disposed around the periphery of the positive and negative electrode material layers 12p and 12n of the cells, by a plastic insulator ring 40 around the periphery of the cell preassembly 10 and interposed between the forms 28p and 28n, and by the peripheral "U" shaped insulator/seal 32. Each of the cells is sealed in a housing 28, having inner and outer walls separated by the peripheral seal 32. The peripheral seal 32, usually polyethylene, can also be an adhesive polymer, such as Surlyn, to seal the cell without pressure-loading where a pressure-release seal is not required.

As is seen in partial cross-section FIG. 9, each cell 30 may have coolant channels 42 in the housing 28. Alternatively coolant channels 42 can be provided by placing a corrugated material 45 sandwiched between the housings 28 of adjacent cells. Thermal/electrical conductivity is maintained between housing 28 and coolant channel 42 by conductive paste or spotwelds when the cooling channel is formed of corrugated material 45.

Each unitary cell preassembly 10 and sandwiching layers 12n and 12p of electrode material and cups 28p and 28n thus comprise a completed cell 30 of the electrochemical device. In each cell, the open end of each respective electrode 12p and 12n is electrically common with cups 28p and 28n, respectively. Alternatively, a piece of conductive material can be interposed between the electrodes 12p and 12n and cups 28p and 28n. The cell preassembly 10 crosses the cell 30, in a generally radial direction, substantially parallel to the cups 28p and 28n and the separator or electrolyte 14 therein assumes a serpentine configuration flattened to extend primarily in the axial direction and transverse to the current collectors and comprised mostly of portions disposed generally axially and of smaller portions disposed radially.

Many individual unitary cells 30 are provided to make up a preferred electrochemical device 46 as illustrated in FIG. 9. The common application of the device is to have a series connected battery, that is to increase the voltage of the device, by stacking the cells 30 and then constrain them as a single unit. The cells provide a cumulative cell voltage output and a common current output. The illustrated cups 28p and 28n are bipolar in nature, each having its opposite faces contacting the positive and negative electrodes 12p or 12n of the adjacent cells. The endmost cups 28p' and 28n' contact terminals 48p and 48n to provide for external connection of the electrochemical device to exterior devices. It is not required that electrochemical device 46 be made up of a plurality of cells 30, each having individual housings 28. Alternatively, each electrode assembly 22 can be separated from the adjacent electrode assembly by any suitable current collector. Effectively, the current collector would thus take the place of, and perform substantially the same function as, cups 28p and 28n of the housing 28.

Usable work in the electrochemical device 30 illustrated in FIG. 9 occurs when ions are transferred between the positive and negative electrodes 12p and 12n via the separator/electrolyte 14, and concurrently when electrons are passed via the electrodes and the adjacent electrode material layers between the terminals of the cups 28p and 28n. In a preferred embodiment, both low resistance electron and heat transfer from electrode to terminal occurs by having electrode substrate and terminal cup surfaces being of the same material. Alternatively, cups 28p and 28n could be spotwelded together with coolant channel 42 to sequentially assemble an electrochemical device with electrode assembly 22 inside each cell housing 30. In assembly of the battery with a unitary assembly of the coolant channel and housing cups, each cell is assembled within its housing consecutively on top of the stack.

The majority of electron transfer takes place in the axial direction along the flattened electrodes and the adjacent electrode material layers, or normal to the current collectors. As noted above, the positive and negative electrodes 12p and 12n are electrically continuous at opposite open ends thereof respectively with the positive and negative material layers 12p and 12n of each cell. Resistance to electron passage via the electrodes will generally be negligible compared to ionic resistance. The sandwiching electrode material layers 12p and 12n can be made with thicknesses to suit the purpose of the electrochemical device, where the thicker presence adds to the capacity of the electrochemical device.

The electron passage through the terminal of the cups 28p and 28n is in the axial direction transverse thereto, so these components can be of thin, lightweight electrically conductive construction. Internal resistance due to the current collectors will also be negligible compared to ionic resistance. The greater concern is electrode contact onto the face of the current collector. Facial conductivity can be preserved or enhanced with a non-oxidizing conductive paste, e.g. NoAlox (Ideal Industries, Sycamore Ill.).

The majority of ion transfer will take place via the interfacial area "A" between the axially extended adjacent overlapping paired electrodes 12p and 12n, in a radial direction and substantially parallel to the terminal of the cups 28p and 28n. Some ion transfer will take place also axially between the closed ends of the electrodes and the adjacent opposite electrode layers. The large interfacial electrode area "A", compared to the cross-section of the cell, reduces internal resistance against ion transfer in the electrochemical device.

Another advantage of the disclosed cell orientation relates to its durability, and thereby allows the separator/electrolyte 14 to be made with a very small thickness "1", for further reducing the ion resistance. This is possible in part because the overall length of overlapping electrodes in the cell preassembly 10 is small, such as less than 10 mm, whereby the separator/electrolyte 14 need structurally separate the electrodes across only these short overlapping lengths. This is possible also because the cell preassembly 10 is initially fabricated and then coiled into the electrode assembly 22, or the cell preassembly 10 is fabricated on and as part of forming the electrode assembly 22. Moreover, the short electronic current flow paths along the lengths of the electrodes (less than 10 mm) do not require highly conductive electrode current collector supplementing or paralleling the electrodes, allowing the electrode structures and the separator/electrolyte 14 to be made of substantially uniform thickness.

The disclosed electrochemical device configuration of FIG. 9, minimizes the mechanical load the separator/electrolyte 14 must support during the cell formation, and thereafter under normal usage; and moreover provides very high specific output energy and specific output power, compared to known electrochemical devices.

As in FIG. 9, a battery of rolled-ribbon cells consists of cells stacked to build voltage. For illustration purposes, the positive cell terminal is on the top 48p and negative cell terminal 48n is on the bottom, the top of the stack is the positive battery terminal, and the bottom is the negative battery terminal. Provision for cooling between cells 30 is provided by coolant channels 42, for example grooves, on the face of either or both cups 28p and 28n, or a separate piece 45 of corrugated material or metal (e.g. aluminum) between the cells in the stack. The entire stack is preferably held together under compression using pieces of resilient material 38, such as individual springs or a Belleville spring washer, within the end restraining plates 50 and/or peripheral brackets 52 of the electrochemical device 46. The spring 38 at the end of the stack serves to apply pressure at the electrode/current collector cup interface as well as to the cell-to-cell surfaces thereby virtually eliminate contact resistance.

An alternative method to constraining the stacked cell is to wrap the battery with "high strength" polymeric material. The cells are stacked, positioned at their periphery, and compressed within a fixture with a hydraulic press before applying the wrap. An example of the packaging of the stacked cell battery is the use of heat shrink Teflon to hold cell stack together and provides a secondary seal.

Contact resistance for the present configuration has been measured at 5-10 micro-ohms for a 125 mm diameter cell under the pressure discussed below. Cell resistance is typically 5-10 milliohms for a 125 mm diameter cell. A second function of the end spring is to regulate the greatest allowable internal cell pressure. For example, a spring compressed at 200-400 lbs used with cell cups 28p and 28n having 20 in$^2$ facial area would maintain 10 psi on all the cells in the stack. If a single cell produced internal pressure exceeding the 10-20 psi limit, the end spring would slightly compress and the peripheral seal 32 of the over pressurized cell would subsequently relax to relieve the overpressure on the cell cups 28p and 28n. This cell would then reseal itself under the spring force. Pressure build up is a safety concern and is not anticipated for properly functioning cells. The stack arrangement also provides for channeling of coolant, such as a silicone dielectric transformer fluid 561 (Dow, USA) from the periphery of one side of the cell stack, between the cell disks in the stack, to the opposite periphery of the cell stack. Alternatively, the present cells when in operation can rely solely on passive cooling without resort to more expensive active cooling measures. The stack temperature can be maintained at 10° C. and rise no more than 10° C. at any point within the stack, even under extreme power demand. It will be readily apparent to one skilled in the art that the force applied to the cups 28p and 28n of the housing 28 can be of any desired strength. Preferred pressures applied by the resilient member 38 can vary greatly, such as in the range of 5 psi to 30 psi, depending upon cell usage.

Figure 10:
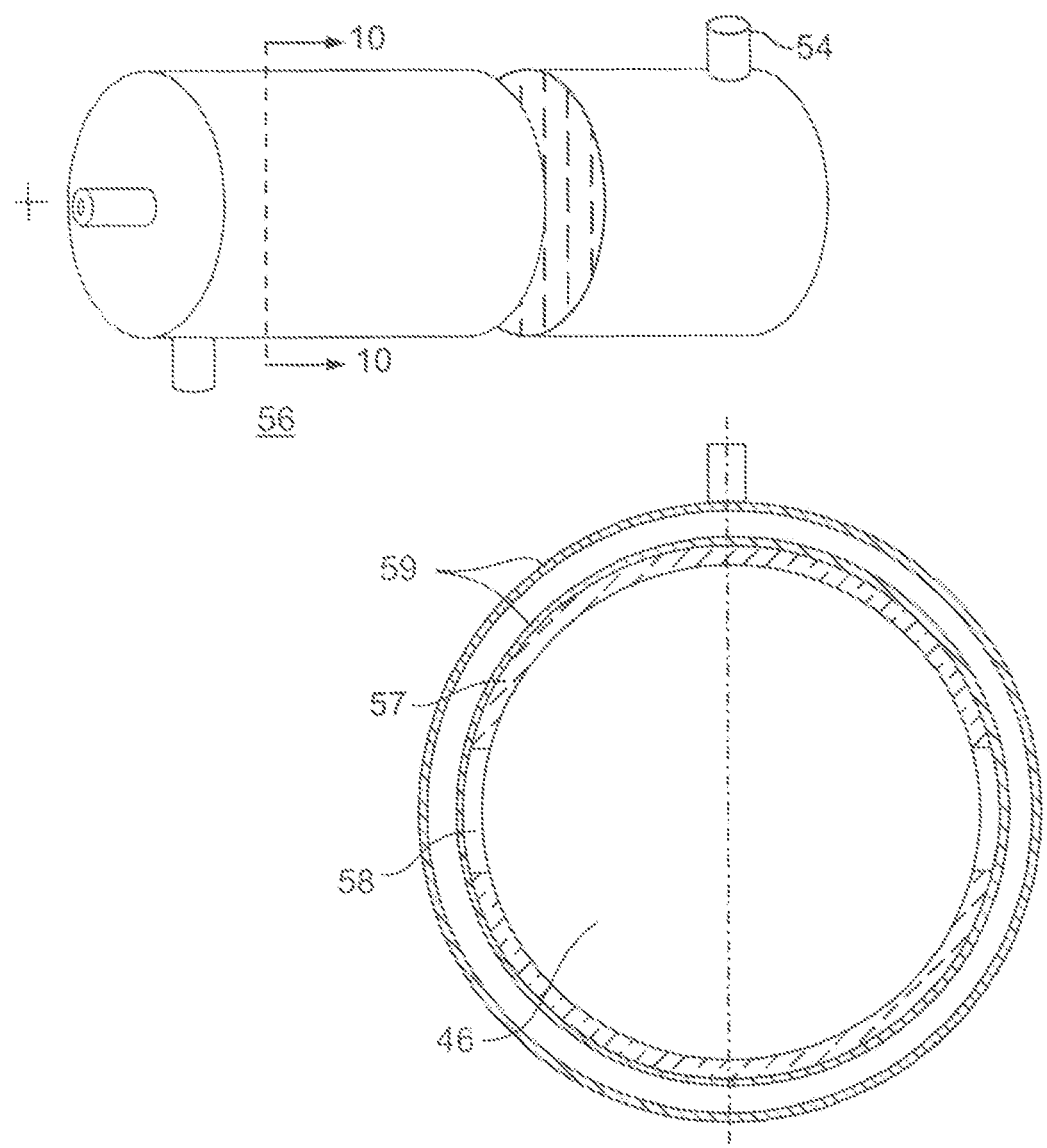
FIG. 10 depicts an embodiment of the present invention that can achieve greater cooling of the electrochemical cells.

FIG. 10 gives further detail in describing the arrangement of cell stack and coolant flow. A polymer jacket creating a 1 mm annulus encapsulates the cell stack with dielectric fluid. Multiple electrochemical devices 46, e.g. batteries, may be contained within the polymer jacket. The jacket has an inlet 54 to an inlet manifold and an outlet 56 from an outlet manifold for circulating coolant 57 and thereby removing heat to an outside refrigeration or radiator system. The ends provide access for the battery terminals (e.g. "O" ring seals). As in section 10-10 of FIG. 10, the inlet and outlet manifolds are separated by means of a manifold seal 58, and the coolant 57 is directed from the periphery of one side of the cell stack through channels between the cells to the opposite stack periphery. This arrangement, in conjunction with the excellent heat removal from the rolled-ribbon cell internals, is capable of temperature control, usually within a few degrees centigrade during typical pulse demand from the battery. To further assure precise temperature control of the cells, the manifolds could be encased in an insulating jacket 59.

By way of summary of this invention, the electrodes overlap and oppose one another over the major portion of the axial thickness of the laminate cell membrane disc, over all but approximately twice the thickness of the separator/electrolyte, which in cross-section zig-zags in a serpentine manner between the electrodes. The positive and negative electrodes are alternatively arranged whereby each is electrically common with only one of the paired current collectors respectively and is extended primarily transverse or even perpendicular thereto.

The component layers of the disclosed cell preassembly can be of very thin ribbon-like cross-sections, less than 1 mm and more typically between 0.01-0.5 mm thick. The electrodes can oppose and overlie one another over small lengths, more typically between 1-25 mm, and the formed cell preassembly and coiled cell membrane are quite narrow, typically less than 10 mm. The opposing electrodes thus overlie one another over lengths at least several times and up to approximately 500 times the thickness of the separator/electrolyte interposed therebetween.

The disclosed rolled-ribbon cell membrane configurations provide interfacial area "A" between the adjacent positive and negative electrodes, far greater by an enhanced area ratio "EAR" than the planar area of either adjacent current collector.

Using the cell preassembly height "h" and width "w" dimensions, a formulation for the enhanced area ratio can be represented as EAR=2 w/h; whereby a cell preassembly having a width "w" of 4-8 mm and a height "h" of 0.2 mm can provide an enhanced area ratio "EAR" of approximately 40-80. By contrast, attempts to overlap electrodes by using corrugations can provide a maximum "EAR" of approximately 2, due in part to fabrication limitations including the allowable minimum thickness of the component layers and the consequential tearing of thin layers at the corners. Electrochemical devices formed with rolled-ribbon cell membranes configured according to this invention thus generate significant outputs, compared to a given cell cross-section and existing technologies.

EXAMPLES OF THE INVENTION

Example 1

Lithium Battery Formed with Liquid Organic-Based Electrolyte

A lithium/organic electrolyte battery can be comprised or fabricated with a carbon/graphite anode; Lithiated nickel cobalt oxide ($LiNiCoO_x$) with carbon cathode (electron conductor) and polyethylene/polypropylene microporous separator with ethylene carbonate/diethylene carbonate (EC/DEC) having dissolved $LiPF_6$ salt as the electrolyte. A cell preassembly ribbon can be built by individual ribbons of the electrode/separator materials. Each electrode component ribbon is 0.060 mm thick and 6.5 mm wide, the separator is 0.025 mm thick and 6.0 mm wide making the overall dimensions 7.0 mm wide and 0.175 mm thick due to 0.5 mm extended electrode portion. Coiling the cell preassembly on itself approximately 350 times forms a 7.5 mm thick by 130 mm diameter electrode assembly disc. Two cup like subassemblies can be fitted around and edges of the electrode assembly and inserted into a peripheral gasket to join the two cups of the housing. The liquid electrolyte (EC/DEC) with dissolved $LiPF_6$ salt is infiltrated prior to being sealed into the housing which also serve as current collector (stainless, aluminum, graphite, or copper are suitable for the cups of this battery). Properly positioned cells are stacked to form a battery. A stack of 60 of such button-type cells can provide a battery having a nominal output of 200 volts under power output.

Figure 11:
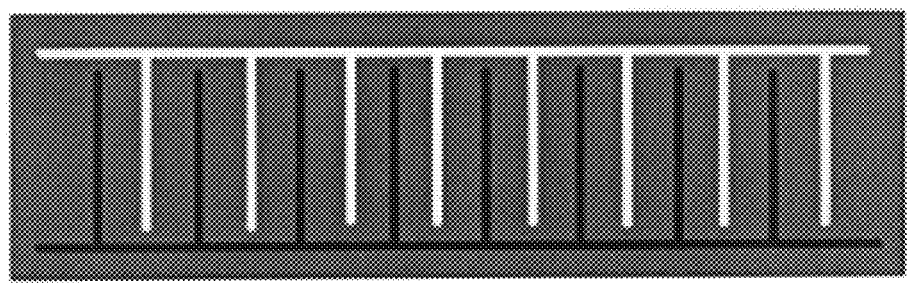
FIG. 11, depicts an arrangement of electrode and cell hardware that is conducive of internal heat rejection, where negative electrode (bottom) and positive electrode (top) communicate with opposite faces of cell hardware to remove heat from separator interface (typically Celgard).

The cells exhibit outstanding heat rejection for good passive thermal management. FIG. 11 is a simplified diagram of FIG. 8 showing in cross-section the arrangement of electrode and cell hardware that is conducive of internal heat rejection. Electrode ribbons act as cooling fins to remove heat from the Celgard interface by large area contact, short path length. The cell hardware acts as a heat sink, and heat need not exit the cell by crossing the Celgard.

Figure 13:
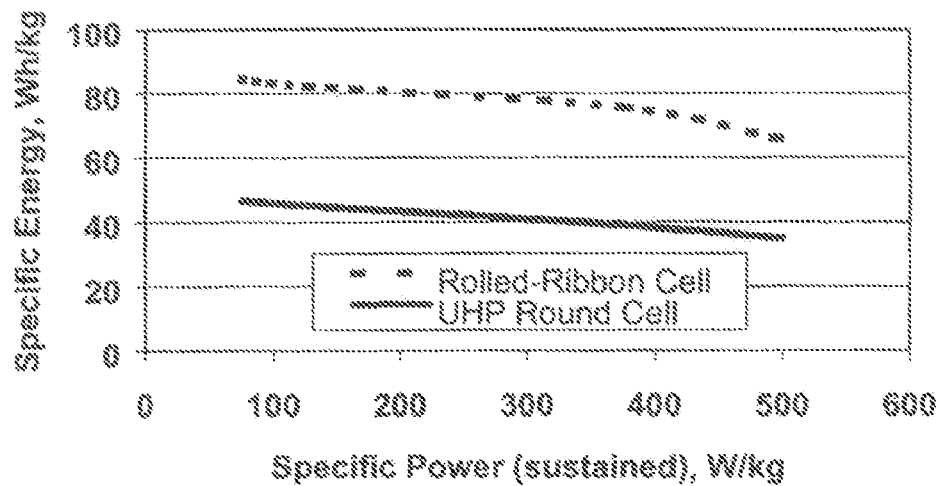
FIG. 13 depicts a plot of cell temperature (5 Ah) from constant power full discharge at 75 W and 100 W, or 6C and 8C rates.

FIG. 12 shows the sensitivity of a cell skin temperature measurement using a J-type thermocouple. Excellent passive thermal management of cells enhances battery safety. The cell (undergoing a HPPC with 60 A discharge pulse for 18 sec and associated charge pulses) has a very manageable 1° C. spike in temperature representing a negligible safety concern. As seen in FIG. 13 even with the much more rigorous sustained power at 100 W (8 C rate) to fully-discharge capacity, the 7° C. rise in temperature still presents only representing a negligible safety concern.

Example 2

Lithium Battery with Liquid Electrolyte and Alternative Electrode Materials A lithium/organic electrolyte battery can be comprised or fabricated as in Example 1. Li-ion cells are typically fabricated in an uncharged state with Lithiated metal oxide positive electrode and carbon black negative electrode. A Lithium salt, 1.2 M $LiPF_6$, is dissolved in organic carbonates (e.g. EC:EMC 3:7 by weight, where EC:DEC is ethylene carbonate:ethylmethyl carbonate) from EM Science, USA. The cell is initially charged in which Li from the metal oxide positive forms $LiC_6$ at the carbon negative. The cell has about 4.0 volts in its fully charged state. The cathode is selected from two major types of material: Lithium nickel-cobalt doped Oxide and Lithium Manganese Oxide Spinel. Both compositions are available from FMC Corp. Lithium Div. Gastonia, N.C. 28054 as Lectro Plus 600 and Lectro Plus 300, respectively. The composition Li $Ni_xCO_yM_zO_2$ is where Nix is $0.6<x<0.8$, Coy is $0.1<y<0.3$, and M z (e.g. Al) $0.05<z<0.1$. The composition $LiMn_2O_4$ is where 2 Li:Mn ratio is 1.02-1.06:1.

Both electrodes consist of high-surface area powders that are held in an 8 wt % PVDF (polyvinylidene fluoride, e.g. KYNAR® 720 (Elf Atochem, USA) binder matrix. The positive electrode also contains 8 wt % carbon black (e.g. MCMB or C-Black) to provide increased electrical conductivity. Both electrodes are applied as a slurry to the metal foils (typically a 10 micron thick copper coil for the negative electrode and a 25 micron thick Al foil for the positive electrode) which after drying adheres as porous layers (50 micron thick each side) held together by PVDF binder which is later infiltrated with the electrolyte. In the cell, these electrode laminates (electrode coated foils) are separated by microporous polyethylene/polypropylene materials of 25 micron thickness which are infiltrated with the electrolyte.

This fabrication/assembly operation is usually accomplished in a dry room. Coiling the cell preassembly on itself approximately 350 times forms a 7.5 mm thick by 130 mm diameter electron assembly. Electrolyte is added to coiled cell assembly with a soft vacuum. Two cup like subassemblies can be fitted around and edges inserted into a peripheral gasket to contain the disc-shaped cell. This cell has a cell-housing composed of aluminum parts. The total cell weight, including electrolyte, is about 220 grams.

A cell of this type is capable of generating 18 second duration power pulses of 300 W at a current of 100 amps. Such a cell is also capable of accepting pulse charging at a similar power level. These are performance capabilities of interest for batteries in hybrid electric vehicles. The overall cell power performance is approximately 98% of theoretical from a simple parallel electrode test.

Figure 15:
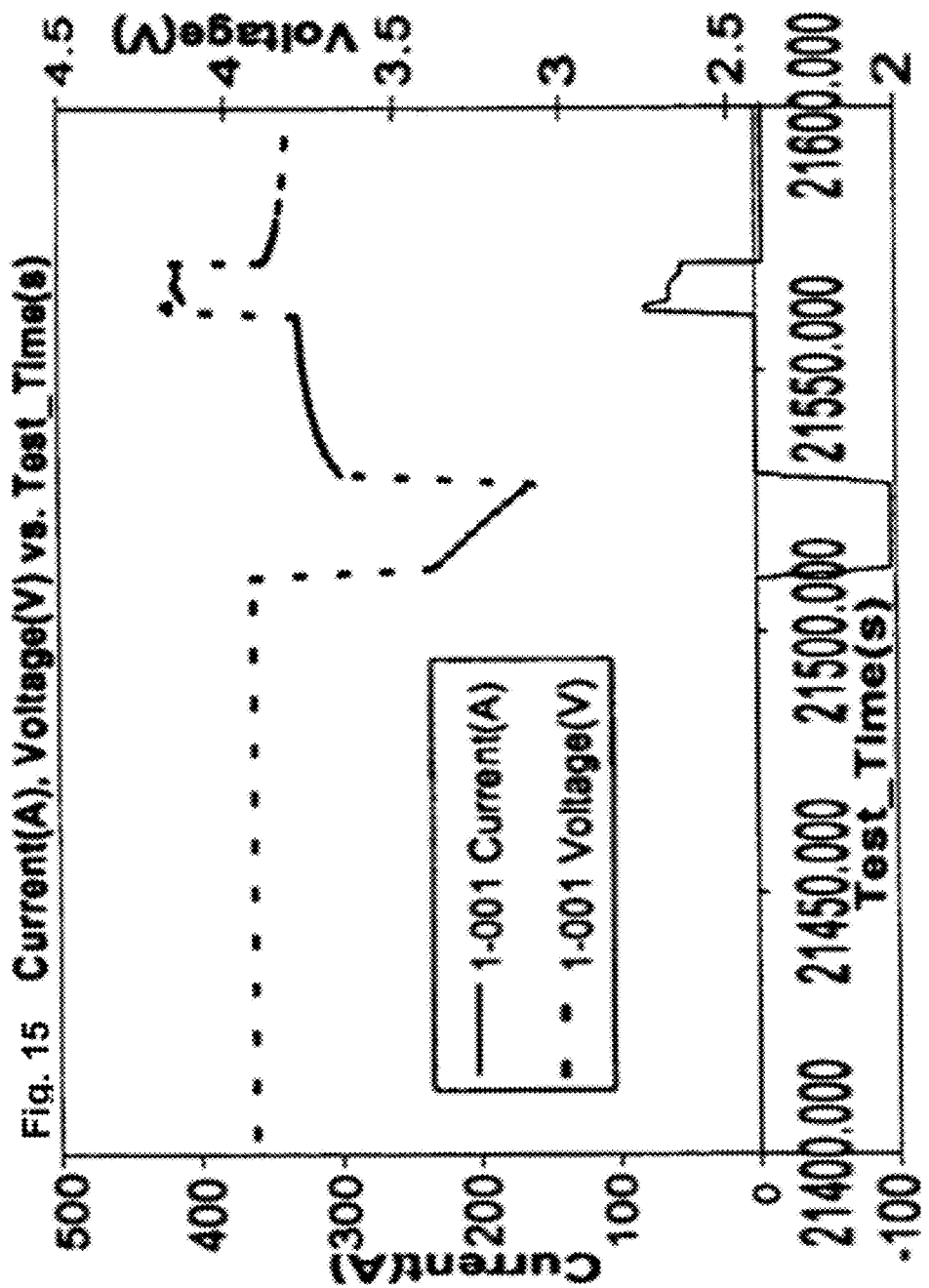
FIG. 15, depicts a cell voltage and current plot vs. time for a cell undergoing a 100 A (20 C rate) 18 sec discharge.
Figure 16:
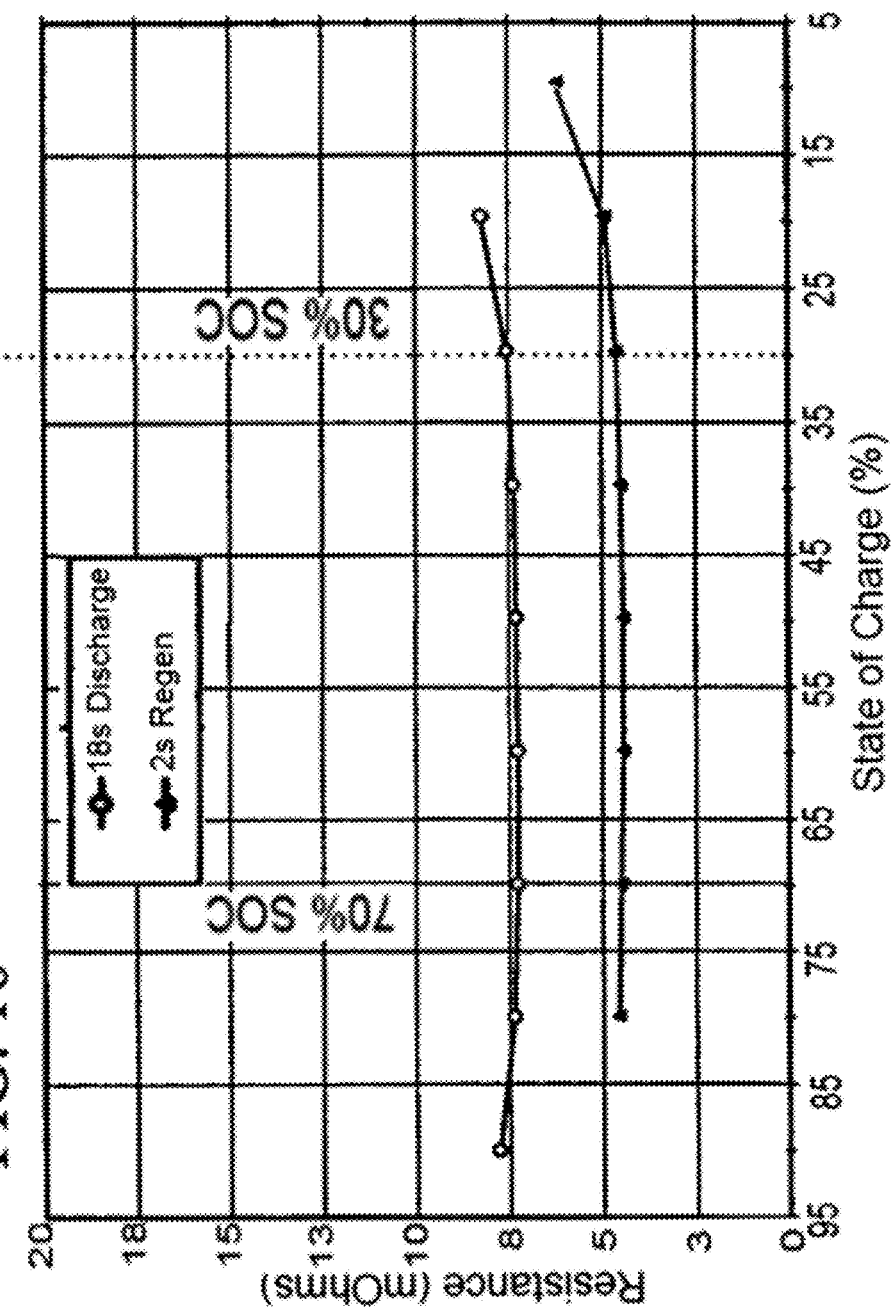
FIG. 16, depicts a plot of Flat Cell Resistance vs. State of Charge (from HPPC-High test) demonstrating expansion of usable cell capacity (5 Ah)

These cells exhibit outstanding high power capability and retain good specific energy, Wh/kg. FIG. 14, a Ragone plot, compares the specific energy of the rolled ribbon cell with a recently published spiral wound Li-ion cell. For high specific power 500 W/kg (sustained power at the 8 C rate), the rolled-ribbon cell specific energy is approximately double the more-conventional spiral wound Li-ion cell. FIG. 15 is a cell voltage and current plot vs. time for the cell undergoing a 100 A (20 C rate) 18 sec discharge. The cell handles this HPPC cycle at about double the typical rate well within voltage specifications (2.5 to 4.1 volts). As in example 1, temperature rise is of negligible concern. Of further interest to the hybrid electric vehicle (known as PNGV), in FIG. 16 the cell resistivity as a function of state of charge is quite flat. Whereas the 40-60% state of charge (SOC) region fulfills HPPC test goals for typical spiral wound Li-ion cells, the rolled-ribbon cell will fulfill HPPC test goals for 10-70% SOC region, providing 3 times greater usable cell capacity. FIG. 17 gives evidence of the peak specific power for these cells, 2.4 kW/kg. The cell is pulsed at 180 A (35 C rate) to provide in excess of 500 W. The cell current vs. time profile indicates relatively little cell polarization loss and good current collection that is anticipated with the disclosed cell design.

FIG. 18 displays the cell voltage and cell current for consecutive charge/discharge cycles for the cell having excessive positive electrode capacity. A reversible shorting phenomenon appears to have occurred as the cell is charged to 4.125V due to the unique compactness of the cell. As a consequence, the cell is safeguarded from destructive overcharging. This reversible cell shorting mechanism can also be used to equalize the battery (make all the cells have the same state of charge) without electronic means. The second charge to 4.000V shows virtually zero current, near 100% Ah efficiency. If the entire battery is charged at a current within the limit of reversible short, each cell in the battery will accept charge to a predetermined voltage and remain at that voltage. Continued charge will then provide an opportunity for all the series-connected cells in the battery to reach the predetermined voltage (eg., 4.125 volts) so all cells in the battery attain full charge.

Example 3

Lithium Battery with Polymer-Based Electrolyte

A lithium/polymer electrolyte battery can be comprised of LiAl/PEO$_{30}$—LiN(CF$_3$SO$_2$)$_2$N$_2$O$_5$ cell with nanocrystalline V$_2$O$_5$ and LiV$_3$O$_8$ using apolyethylene oxide based polymer (PEO) electrolyte/separator. The LiAl alloy composite anode contains 60% LiAl powder (46.0 atom % Li), 35% polymer electrolyte, and 5% of acetylene carbon black on a copper substrate. A vanadium cathode of similar weight portion has an aluminum substrate. The thickness of the electrode laminates can range between 10 to 30 μm by a casting method. The cell preassembly ribbon can be built up by individually and sequentially painting with stencil guides, etc. the components on the underlying cell preassembly while being coiled on a mandrel. Each component ribbon can be 0.05 mm thick; and each electrode can be 0.95 mm wide and the electrolyte can be 1.00 mm wide overall with the 0.05 mm wide double thick staggered end portions, to define a cell preassembly 1.00 mm wide and 0.20 mm high. Coiling the cell preassembly (with the PEO face out) on itself 200 times can form a 1 mm thick 80 mm diameter cell electrode assembly. The electrode components as sized can radially overlap and oppose one another over approximately 0.90 mm. A 0.25 mm thick 80 mm diameter lithium foil disc can be applied to the lithium side of the cell membrane, while a 0.5 mm thick 80 mm diameter TiS$_2$ layer can be applied to the cathode side of the cell membrane. Like subassemblies can be inserted into peripherally containing forms and between adjacent current collectors (of stainless steel, nickel molybdenum or carbon), at least the intermediate ones being bipolar, and sealed to form the battery. A stack of fifty five of such cells can provide a battery having a nominal output of 110 volts.

Example 4

Battery with Nickel Metal Hydride Electrode Components

A nickel/metal hydride battery can be comprised of nickel oxide Ni(OH)$_2$ electrodes, metal hydride alloy (e.g. V—Ti—Zr—Ni—Cr) electrodes, and a polymer separator, such as nylon or microporous polyethylene. The cell preassembly ribbon can be built up by using ribbons of the components on the underlying cell preassembly while being coiled on a mandrel. Each component electrode ribbon can be 0.10 mm thick 9.5 mm wide and the electrolyte\separator can be 0.05 mm thick and 9.0 mm wide overall with the 0.10 mm wide double thick staggered end portions, to define a cell preassembly 10.0 mm wide and 0.30 mm high. Coiling the cell preassembly on itself 200 times forms a 10.0 mm thick 125 mm diameter cell membrane disc. The electrode components as sized can radially overlap and oppose one another over approximately 9.0 mm. Like subassemblies can be inserted into peripherally containing forms and between adjacent current collectors (of stainless steel, nickel molybdenum or carbon), and sealed individually to form the stacked cell battery. A stack of eighty-five of such cells can provide a battery having a nominal output of 100 volts.

Example 5

Supercapacitor Battery with Organic-Based Electrolyte

A hybrid supercapacitor battery can be comprised of carbon/graphite anode; Lithiated nickel cobalt manganese oxide (LiNiCoMnO$_x$) with carbon cathode (electron conductor) and polyethylene/polypropylene microporous separator with ethylene carbonate/diethylene carbonate (EC/DEC) having dissolved LiPF$_6$ salt as the electrolyte/separator. A Lithium salt, 1.2 M LiPF$_6$, is dissolved in organic carbonates (e.g. EC:EMC 3:7 by weight, where EC:DEC is ethylene carbonate:ethylmethyl carbonate) from Ferro Corporation. The cell is initially charged in which Li from the metal oxide positive forms LiC$_6$ at the carbon negative. The cell has about 3.0 volts in its fully charged state. The type and amount of carbon used at the anode, such as carbon nanotubes, limits the charge transfer at full charge to predominantly surface double-layer. The thickness of the electrode laminates can range between 2 to 5 μm by a deposition method. Each component ribbon can be 0.05 mm thick; and each electrode can be 0.95 mm wide and the electrolyte can be 1.00 mm wide overall with the 0.05 mm wide double thick staggered end portions, to define a cell preassembly 1.00 mm wide and 0.20 mm high. Coiling the cell preassembly (with the separator face out) on itself 200 times can form a 1 mm thick 80 mm diameter cell electrode assembly. The electrode components as sized can radially overlap and oppose one another over approximately 0.90 mm. Like subassemblies can be inserted into peripherally containing forms and between adjacent current collectors (of stainless steel, nickel molybdenum or carbon), at least the intermediate ones being bipolar, and sealed to form the battery. A stack of fifty of such supercapacitor cells can provide a battery having a nominal output of 150 volts.

The present methods can involve any or all of the steps or conditions discussed above in various combinations, as desired. Accordingly, it will be readily apparent to the skilled artisan that in some of the disclosed methods certain steps can be deleted or additional steps performed without affecting the viability of the methods.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

All references disclosed herein are specifically incorporated by reference thereto.

While preferred embodiments have been illustrated and described, it should be understood that changes and modifications can be made therein in accordance with ordinary skill in the art without departing from the invention in its broader aspects as defined in the following claims.

The invention claimed is:

1. An electrochemical device, comprising:
    an electrode assembly comprising: an elongated positive electrode;
    an elongated negative electrode; and
    a plurality of separation layers engagable with each other to form a continuous separation barrier between each of the positive electrode and the negative electrode; the plurality of separation layers positioned such that the positive electrodes, separation layers, and negative electrode are wound around a central axis thereby forming a coil of alternating electrode and separation layers such that the separation layer prevents direct contact between successive electrode layers;
    a first longitudinal edge of the positive electrode extending beyond a first longitudinal edge of the separation layer, and a first longitudinal edge of the negative electrode extending beyond a second longitudinal edge of the separation layer such that the plurality of separation layers is tensioned across the electrode assembly and defines a cell width with the width of the electrodes extending beyond the width of the plurality of separator layers; and
    a housing having a positive plate electrically coupled to the first longitudinal edge of the positive electrode and a negative plate electrically coupled to the first longitudinal edge of the negative electrode, wherein the electrode assembly is enclosed by the housing.

2. The device of claim 1, wherein the separation layer comprises a central portion having a first end and second end and a first protruding portion and second protruding portion with the central portion being longer than the first and second protruding portions, the first and second protruding portions extending from substantially the first and second ends respectively with the negative electrode partially disposed between the central portion and the first protruding portion and the positive electrode partially disposed between the central portion and the second protruding portion.

3. The device of claim 2, wherein each of the protruding portions of each of the plurality of separation layers overlaps the protruding portion of another separation layer.

4. The device of claim 3, wherein the separation layers are indexed such that position of the overlap of the separation layers varies substantially evenly across the cell width.

* * * * *